United States Patent
Von Koenigsegg et al.

(10) Patent No.: US 12,498,033 B2
(45) Date of Patent: Dec. 16, 2025

(54) GEARBOX AND STARTER ARRANGEMENT

(71) Applicant: Koenigsegg Automotive AB, Ängelholm (SE)

(72) Inventors: Christian Von Koenigsegg, Vejbystrand (SE); Emil Langeland Larsen, Ängelholm (SE); Ruben Lend, Vejbystrand (SE)

(73) Assignee: KOENIGSEGG AUTOMOTIVE AB, Ängelholm (SE)

( * ) Notice: Subject to any disclaimer, the term of this patent is extended or adjusted under 35 U.S.C. 154(b) by 0 days.

(21) Appl. No.: 18/701,669

(22) PCT Filed: Oct. 17, 2022

(86) PCT No.: PCT/EP2022/078857
§ 371 (c)(1),
(2) Date: Apr. 16, 2024

(87) PCT Pub. No.: WO2023/066871
PCT Pub. Date: Apr. 27, 2023

(65) Prior Publication Data
US 2024/0392872 A1   Nov. 28, 2024

(30) Foreign Application Priority Data

Oct. 18, 2021 (EP) .................................. 21203212

(51) Int. Cl.
*F16H 57/021* (2012.01)
*F16H 48/08* (2006.01)
*F16H 48/26* (2006.01)

(52) U.S. Cl.
CPC .......... *F16H 57/021* (2013.01); *F16H 48/08* (2013.01); *F16H 48/26* (2013.01)

(58) Field of Classification Search
CPC .......... F16H 57/021; F16H 48/08; F16H 48/26
See application file for complete search history.

(56) References Cited

U.S. PATENT DOCUMENTS

| | | | | |
|---|---|---|---|---|
| 7,367,416 | B2* | 5/2008 | Seufert | B60K 6/48 477/8 |
| 7,950,480 | B2* | 5/2011 | Raoul | B60K 6/547 180/65.25 |
| 8,257,221 | B2* | 9/2012 | Leufgen | B60W 20/40 477/6 |
| 8,858,377 | B2* | 10/2014 | Iwasa | F16H 3/724 475/5 |
| 2017/0167546 | A1 | 6/2017 | Satoi et al. | |
| 2021/0252962 | A1* | 8/2021 | Yano | B60K 6/36 |

FOREIGN PATENT DOCUMENTS

ES   2222053 A1   1/2005

* cited by examiner

*Primary Examiner* — Thomas C Diaz
(74) *Attorney, Agent, or Firm* — Howard J. Klein; Shore IP Group, PLLC

(57) ABSTRACT

A gearbox for a road vehicle includes a gearbox case, a first shaft, and a second shaft, wherein the first shaft has a first end and a second end, the first end being configured to receive torque. A plurality of first gear assemblies is located inside the gearbox case, wherein each of the first gear assemblies includes a first gear wheel positioned on the first shaft, and a second gear wheel positioned on the second shaft. A starter-gear wheel is positioned on and attached to the first shaft, wherein the plurality of first gear assemblies is located between the starter-gear wheel and the first end of the first shaft.

17 Claims, 9 Drawing Sheets

GEARBOX AND STARTER ARRANGEMENT

CROSS-REFERENCE TO RELATED APPLICATIONS

This application is a national phase entry, under 35 U.S.C. 371, of International Application No. PCT/EP2022/078857, filed Oct. 17, 2022, the disclosure of which is incorporated herein by reference in its entirety. International Application No. PCT/EP2022/078857 claims priority from European Application No. 21203212.2, filed Oct. 18, 2021.

TECHNICAL FIELD

The proposed technology generally relates to the field of gearboxes for road vehicles, and in particular to the field of gearboxes and starter arrangements for high-performance cars.

BACKGROUND

Reciprocating internal-combustion engines are generally provided with a flywheel for smoothing out the intermittent torque output of the engine. The flywheels are typically juxtaposed to, or in close proximity with, the engine. In applications relating to road vehicles, the flywheel is typically provided with a starter-ring gear at its outer edge. The starter-ring gear meshes with a pinion connected to the rotor of an electric starter motor. This way, the starter motors can turn engines at ignition. When the ignition switch is turned, the starter motor provides torque that turns the flywheel, which in turn spins the engine over. As the engine starts to operate, the starter motor disengages, and the pinion is taken out of contact with the flywheel.

The flywheel contributes to the weight of the vehicle, which has a negative impact on the performance of the vehicle, and in extension on the environmental footprint when driving. Additionally, the flywheel typically has a large diameter, which contributes to larger engine compartments, and in extension to heavier vehicle chassis.

Gearboxes are commonly used in combination with reciprocating internal-combustion engines and contribute significantly to both the weight and size of the powertrain.

Therefore, it is desirable to provide a high-performance car having a lightweight and compact engine, starter motor arrangement, and gearbox arrangement. However, this is hard to achieve using conventional designs or components, since decreasing the weight of the gearbox and/or and starter arrangement is difficult without compromising robustness and performance.

SUMMARY

In view of the above, an object of the proposed technology is to overcome, or at least mitigate, some of the mentioned drawbacks.

In a first aspect of the proposed technology, a gearbox, or gearbox assembly, for a road vehicle is provided that comprises: a gearbox case, a rigid first shaft and a rigid second shaft. The first shaft has a first end, or rear end, an and a second end, or forward end. The first end is configured, or intended, to receive torque. The gearbox further comprises a plurality of first gear assemblies located inside, or within, the gearbox case and operationally connecting, or configured to transfer torque between, the first shaft and the second shaft. Each first gear assembly comprises a first gear wheel and a second gear wheel. The first gear wheel is centered, or positioned, on the first shaft. The second gear wheel is centered, or positioned, on the second shaft.

In a second aspect of the proposed technology, a powertrain for a road vehicle is provided. The powertrain comprises: an internal combustion engine, and a gearbox according to the first aspect of the proposed technology. The gearbox is operatively connected to the internal combustion engine.

In a third aspect of the proposed technology, a road vehicle is provided. The road vehicle comprises a powertrain according to the second aspect of the proposed technology.

The gearbox may further comprise a starter-gear wheel. The starter-gear wheel is centered, or positioned, on and rigidly attached to the first shaft. The plurality of first gear assemblies may be located between the starter-gear wheel and the first end of the first shaft. Alternatively, one or more of the first gear assemblies may be located between the starter-gear wheel and the first end of the first shaft.

It is understood that the first end and the second end are on opposite sides of the first shaft. The terms "rear" and "forward" in relation to the first shaft is understood as indicating the general direction the torque is supplied in, or transferred, by the first shaft. The first end may be configured to connect to an output shaft, or crankshaft, of an engine, or combustion engine, for example by a spline joint. The first end of the first shaft may be accessible from, or located, outside the gearbox case.

It is understood that the first shaft and the second shaft are parallel. It is further understood that the different shafts of the gearbox are rotationally supported relative to the gearbox case.

The gearbox may have three, or three or more, first gear assemblies. Each first gear assembly may further comprise a wet clutch, or a single wet clutch, configured to engage and disengage the first gear assembly. In each first gear assembly, the wet clutch may be centered, or positioned, on the first shaft or on the second shaft.

It should be noted that the position of the wet clutches with respect to the gear wheels is not specified above. In each gear assembly, the wet clutch can be positioned either before or after the gear wheels. The gear wheels may for example be helical cogwheels.

The first shaft, the starter-gear wheel, and each first gear assembly contribute to the effective rotational inertia, or moment of inertia, of the first shaft. Here, the effective rotational inertia is regarded as the rotational inertia that influences changes in the rotational speed of the first shaft. If the wet clutch of a gear assembly is centered, or positioned, on the first shaft, the components of the wet clutch that are fixed to the first shaft will contribute to the effective rotational inertia. If the wet clutch of a gear assembly is centered, or positioned, on the second shaft, the first gear wheel, the second gear wheel, and the components of the wet clutch that are fixed to the second gear wheel will contribute to the effective rotational inertia. The effective rotational inertia reduces, or even removes, the need of a dedicated flywheel for operating the engine.

The first end of the first shaft may be located outside the gearbox case. The gearbox case may comprise, or form, a first first-shaft aperture. The first end may be at the first first-shaft aperture. Alternatively, the first shaft may extend from the gearbox case in the direction of the first end, preferably through the first first-shaft aperture.

The starter-gear wheel may be positioned, or located, within the gearbox case. The starter-gear wheel may be configured to operationally connect to a starter motor. The starter-gear wheel may comprise a starter-ring gear.

A starter-ring gear is typically mounted on a flywheel of an engine. The additional rotational inertia, in particular from the first shaft and the wet clutches, reduces, or removes, the need for a flywheel. It should be noted that this effect is present only if there is no clutch or decoupling mechanism between the gearbox and the engine.

It is understood that any gear of the proposed technology may be manufactured of steel, or a suitable alloy.

The gearbox may be configured to be used in a road vehicle, in particular a high-performance car. It may be configured to adapt the output torque of a reciprocating internal combustion engine to the drive wheels of the road vehicle. It may be configured to connect permanently, or rigidly, to the crank shaft of the internal combustion engine. It may further be configured to connect permanently, or rigidly, to a final drive, that in turn may be connected to the drive wheels, for example by way of one or more drive axles.

The gearbox may be configured for a operate at a rotation of the first shaft of at least 5000 rpm, 6000 rpm, 7000 rpm, 8000 rpm, 9000 rpm, or 10000 rpm. The gearbox may have a minimum and maximum gear ratio between the third shaft and the first shaft that is within the range 0.6 to 5.0, or within the range 0.5 to 6.0. The ranges described here are suitable for high-performance cars.

The gearbox may further comprise: an electric starter motor, a pinion shaft, and a first pinion. The pinion shaft is operationally connected to the electric motor. The first pinion is fixed to, centered on, or positioned on, the pinion shaft. The first pinion cooperates, or meshes, with the starter-gear wheel, or the starter-ring gear. In other words, the gearbox may comprise an electric starter motor operationally connected to the starter-gear wheel, or the starter-ring gear.

That the pinion shaft is operationally connected to the electric motor means that it is configured to receive torque from the electric motor. The first pinion may be located inside, or within, the gearbox case. The pinion shaft may be accessible from outside the gearbox case. The electric motor may be located outside the gearbox case. The gearbox case may comprise, or form, a pinion-shaft aperture. The pinion shaft may enter the gearbox case through the pinion-shaft aperture. The electric motor may be supported by, or fixed to, the gearbox case. This way, torque can be transferred from outside the gearbox case to the crank shaft of the engine via the pinion shaft, the first pinion, the starter-gear wheel and the first shaft.

The starter-gear wheel of the gearbox may have a conical portion. The conical portion may have a wide end. The wide end may face towards the first end of the first shaft. The conical portion may further have a narrow end. The narrow end may face away from the first end of the shaft.

In an alternative wording, the starter-gear wheel may have a concave side facing the first end of the first shaft and a convex side facing away from the first end of the shaft. A first gear assembly of the plurality of first gear assemblies may have its wet clutch juxtaposed to, or at, the starter-gear wheel. The wet clutch may be positioned, or interposed, between the first gear wheel of the first gear assembly and starter-gear wheel. This allows for the starter-gear wheel to extend axially and at least in part cover the wet clutch. In extension, this contributes to more compact gearbox. This is particularly advantageous if the gearbox has a bevel gear, or a differential, positioned on the same side of the gearbox as the starter-gear wheel.

The wet clutch of each first gear assembly may be centered, or mounted, on the first shaft and may operationally connect the first gear wheel and the first shaft. The operational connection of the first gear wheel and the first shaft means that the first gear wheel can be disengaged from the first shaft.

The gearbox may further comprise a rigid third shaft and a plurality of second gear assemblies operationally connecting, or configured to transfer torque between, the second shaft and the third shaft. The third shaft may have a first end, or rear end, and a second end, or forward end. The second end may be configured to deliver torque from the gearbox. The plurality of second gear assemblies may be located inside, or within, the gearbox case. Each second gear assembly of the plurality of second gear assemblies may comprise: a third gear wheel and a fourth gear wheel. The third gear wheel may be centered on the second shaft. Further, the fourth gear wheel may be centered on the third shaft.

It is understood that the first end and the second end are on opposite sides of the third shaft. The terms "rear" and "forward" in relation to the third shaft is understood as indicating the general direction the torque is supplied in, or transferred, by the third shaft.

The first shaft may be rigid. It is understood that it means that the rigid shaft constitutes a single unit, or unitary body, that cannot split into smaller units or change shape during operation.

It is further understood that the first shaft and the third shaft are parallel. The first end of respective first shaft and the second shaft may be oriented, or point, in the same direction. Similarly, the second end of respective first shaft and the second shaft may be oriented, or point, in the same direction. The first end of the first shaft and the second end of the third shaft may be located at opposite ends of the gearbox, or gearbox case.

The first shaft may be permanently, or rigidly, coupled to the crank shaft, which means that there can be no clutch or torque converter between the combustion engine and the gearbox. Similarly, the third shaft may be permanently, or rigidly, coupled to the final drive, which means that there can be no clutch or torque converter between the gearbox and the final drive.

Each second gear assembly may comprise a wet clutch, or a single wet clutch, configured to engage and disengage the second gear assembly. In each second gear assembly, the wet clutch may be centered, or positioned, on the second shaft or on the third shaft.

It is understood that the different shafts of the gearbox are rotationally supported relative to the gearbox case.

The gearbox may further comprise a bevel gear, or bevel-gear set, operationally connected to the third shaft. Alternatively, the bevel gear, or bevel-gear set, may be operationally connected to the second shaft if there is no third shaft.

The gearbox case may form a first enclosed space. The plurality of first gear assemblies may be located within the first enclosed space. The plurality of second gear assemblies may also be located within the first enclosed space. The gearbox case may further form a second enclosed space. The second enclosed space may be separate from the first enclosed space. Here, it is understood that an enclosed space is configured to contain, or maintain, a fluid, or liquid, such as a lubricant and/or coolant, within the enclosed space, or that it is configured to prevent a fluid, or liquid, within the enclosed spaced from leaving, or escaping, for example to outside the enclosed space or to a neighboring enclosed space.

The bevel gear may be located within the second enclosed space. This means that the gearbox case forms a bevel-gear housing. This way, different lubricants and/or coolants can be used for the bevel gear and the other components of the gearbox that are within the first enclosed space.

The bevel gear may be operationally connected to the third shaft, or the second shaft if there is no third shaft. It may be connected to the second end of the third shaft. The second end of the third shaft may be located outside the gearbox case. Alternatively, it may be located within the second enclosed space. The gearbox case may comprise, or form, a third-shaft aperture through which the third, or second, shaft extends, for example from the first enclosed space. The third-shaft aperture may be between the first enclosed space and the second enclosed space. The gearbox may comprise a seal preventing a fluid, or liquid, from passing through the third-shaft aperture.

The bevel gear may comprise a bevel-gear pinion and a cooperating, or meshing, bevel-gear wheel, or crown wheel. The bevel-gear pinion and the bevel-gear wheel may be located outside the gearbox, or in the second enclosed space. The bevel-gear pinion may be attached, or fixed to the third shaft, or the second shaft if there is no third shaft. The bevel-gear pinion may be attached, or fixed to, the second end of the third shaft.

Alternatively, the bevel-gear pinion or the bevel gear may be located within the first enclosed space. Worded differently, the first enclosed space and the second enclosed space may be joined to form a single enclosed space, or the first enclosed space may be in fluid communication with the second enclosed space. This means that the same lubricant and/or coolant can be used for the bevel gear and the other components of the gearbox.

The bevel-gear pinion is understood to be smaller, or have fewer teeth, or cogs, than the bevel-gear wheel, or the bevel-gear pinion is understood to rotate at a higher rate than the bevel-gear wheel. The teeth on bevel gears can be arranged in straight tooth lines, spiral tooth lines, or zerol tooth lines. The bevel-gear pinion may be rotationally fixed, or rigidly attached, to the third shaft, or to the second shaft. This may be at the second end of the third shaft. The bevel-gear pinion and the third shaft, or the second shaft, may form, or constitute, a monolithic structure.

The bevel-gear wheel may have an axis of rotation that is transverse, or at a right angle, to the third shaft, or to the second shaft. The bevel gear may comprise a gear-output shaft, or center axle, which may be transverse, or at a right angle, to the third shaft, or to the second shaft.

The gear-output shaft may be fixed to, or rigidly supported by, the bevel-gear wheel. The gear-output shaft may have a first end, or first output end, and a second end, or second output end. The first end and the second end of the gear-output shaft are on opposite sides, or opposite first and second sides, of the bevel-gear wheel. The gear-output shaft, or the first end and the second end of the gear-output shaft, may extend from, the gearbox case.

It is understood that the bevel-gear pinion and the bevel-gear wheel may operationally connect the third shaft, or the second shaft, and the gear output shaft. It is further understood that the bevel gear converts, or transfers, an input torque received by the third shaft to an output torque supplied by the gear output shaft at the first end and the second end.

The gear-output shaft may extend from the gearbox case. This means that the gear-output shaft exits the housing on opposite sides, or opposite first and second sides, of the gearbox case.

The starter-gear wheel may be in part, or at least in part, positioned, or interposed, between the bevel gear and the first shaft.

Here, positioned, or interposed, between means that a straight line starting from a portion of the bevel gear and ending on a portion of the shaft intersects the starter-gear wheel. Additionally, or alternatively, the starter-gear wheel may in part, or at least in part, be positioned, or interposed, between the bevel gear and a first gear assembly of the plurality of first gear assemblies, or between the bevel gear and the wet clutch of a first gear assembly of the plurality of first gear assemblies.

The gearbox may further comprise a differential. The differential may be operationally connected to the third shaft. Alternatively, the differential may be operationally connected to the second shaft if there is no third shaft. The differential may be a limited-slip differential or an open differential. It is understood that the differential is configured to receive torque from the third shaft, or from the second shaft if there is no third shaft.

The differential may comprise the bevel gear. Worded differently, the bevel gear may form part of the differential. Instead of having single gear-output shaft, the differential has a first gear-output shaft and a second gear-output shaft that are operationally connected to the bevel-gear wheel. It is understood that the first gear-output shaft and the second gear-output shaft deliver torque and can rotate, or be operated to rotate, at different rates or supply different amounts of torque. The first gear-output shaft and the second gear-output shaft may be parallel, or coaxial. The first gear-output shaft and the second gear-output shaft may transverse, or at a right angle, to the third shaft, or to the second shaft.

The first gear-output shaft and the second gear-output shaft may be on opposite sides, or opposite first and second sides, of the bevel-gear wheel, or the differential. The first gear-output shaft and the second gear-output shaft may extend from the gearbox case.

The differential may be located within the second enclosed space. This means that the gearbox case forms differential housing separated from the first enclosed space housing the gear assemblies.

Alternatively, the differential may be located within the first enclosed space. Worded differently, the first enclosed space and the second enclosed space may be joined to form a single enclosed space, or the first enclosed space may be in fluid communication with the second enclosed space. This means that the differential is located within the same enclosed space as the gear assemblies, and that the same lubricant and/or coolant can be used for the differential and the gear assemblies.

The gearbox may further comprise: a counter shaft, a reverse-gear assembly, and a first pump. The reverse-gear assembly may be located inside, or within, the gearbox case, or within the first enclosed space. The reverse-gear assembly may operationally connect, or be configured to transfer torque between, the first shaft and the second shaft via the counter shaft. The first pump may be operationally connected to the counter shaft. It is understood that the first pump is powered by torque supplied via the counter shaft, wherein the pressure in the first fluid is generated at a rotation of the counter shaft. The first pump may be configured to generate a pressure in, and/or a flow of, a first fluid. More specifically, wherein the pressure in the first fluid may be generated at a rotation of, or torque supply from, the counter shaft.

The reverse-gear assembly may further comprise a wet clutch configured to engage and disengage the reverse-gear assembly, or to engage and disengage the connecting of the first shaft and the second shaft via the counter shaft. The reverse-gear assembly may comprise a reverse-gear set with gear wheels centered, or positioned, on each of the first shaft, the counter shaft, and the second shaft. The reverse gear set may comprise a fifth gear wheel centered on the first shaft, a sixth gear wheel centered on the counter shaft, and a seventh gear wheel centered on the second shaft. The fifth gear wheel may mesh with the sixth gear wheel, and the sixth gear wheel may mesh with the seventh gear wheel. Alternatively, the reverse gear set may comprise a fifth gear wheel centered on the first shaft, a sixth gear wheel, and a seventh gear wheel centered in the counter shaft, and an eighth gear wheel centered on the second shaft. The fifth gear wheel may mesh with the sixth gear wheel, and the seventh gear wheel may mesh with the eighth gear wheel. The reverse-gear assembly may be configured for operationally connecting the first shaft and the second shaft via the counter shaft. The counter shaft results in a reversed rotational direction of the second shaft.

The first fluid may be a coolant and/or lubricant. The gearbox may be configured to release, or distribute, the first fluid pressurized by the first pump within the first enclosed space, for example for lubricating and cooling rotating parts. Specifically, the gearbox may be configured to release, or distribute, the first fluid pressurized by the first pump at the plurality of first gear assemblies, the plurality of second gear assemblies, and/or the differential. For example, it may be released at the gear wheels connecting the shafts, or bearings supporting rotationally supported gear wheels. Worded differently, the gearbox may be configured to supply the first fluid pressurized by the first pump to the plurality of first gear assemblies, the plurality of second gear assemblies, and/or the differential.

The first fluid may be supplied to the wet clutches of each gear assembly, for example via the shafts the wet clutches are centered, or mounted, on, for example for cooling and lubricating the wet clutches. The shafts may be hollow, or have a hollow interior through which the first fluid is supplied to the wet clutches.

The reverse-gear assembly may be configured to engage and disengage the second shaft from the counter shaft, or for controlling the torque transfer between the counter shaft and the second shaft. The wet clutch of the reversed gear assembly may be centered, or positioned, on the second shaft. This would typically result in a reduced torque load on the wet clutch.

The first shaft and the counter shaft may rotate at a fixed relative rate. The gear wheels connecting the first shaft to the counter shaft may be rotationally fixed, or locked, to the shaft it is centered, or positioned on. The first pump may be permanently coupled, or rotationally fixed, to the counter shaft. This has the effect that the first pump cannot be disconnected from the first shaft and always generates a pressure, or can generate a pressure, in the first fluid when the engine is running, or the starter motor is operated. In extension, this ensures a reliable supply of coolant and/or lubricant to the wet clutches when the vehicle is operated.

The gearbox may further comprise: a second pump operationally connected to the first shaft. It is understood that the second pump is powered by torque supplied via the first shaft. The second pump may be configured to generate a pressure in, and/or a flow of, a second fluid. More specifically, the pressure in the first fluid may be generated at a rotation of, or a torque supply from, the first shaft.

The second fluid may be a hydraulic fluid. The hydraulic fluid may be based on synthetic or mineral oil. The first fluid and the second fluid may be the same kind of fluid. The second end of the first shaft may be located outside the gearbox case. The second pump may be located outside the gearbox case. The second pump may be operationally connected to the second end of the first shaft. The gearbox case may comprise, or form, a second first-shaft aperture through which the first shaft extends in the direction of the second end.

The second pump may be permanently coupled, or rotationally fixed, to the first shaft. This has the effect that the second pump cannot be disconnected from the first shaft and always generates a pressure, or can generate a pressure, in the second fluid when the engine is running, or the starter motor is operated. In extension, this ensures a reliable hydraulic control when the vehicle is operated.

The gearbox may further comprise a control unit. The control unit may be operationally coupled or connected, to each wet clutch, or to the wet clutch of each first gear assembly, to the wet clutch of each second gear assembly, and/or the wet clutch of the reverse-gear assembly. The control unit being operationally connected to each wet clutch means that the control unit controls the function of each wet clutch. The control unit may be configured to individually control the function of each wet clutch, for example to individually engage or disengage each wet clutch.

The control unit may be operationally connected, or coupled to, or in fluid communication with, the second pump, for example to receive the pressurized second fluid from the second pump. Worded differently, the second pump may supply the control unit with a pressurized hydraulic fluid, or with the pressurized second fluid.

Each wet clutch may be hydraulically operated, for example by the second fluid pressurized by the second pump. The control unit may be in fluid communication with each wet clutch. The control unit may be configured to individually control the supply of the pressurized second fluid to each wet clutch.

Each wet clutch may be individually coupled to the control unit by a hydraulic conduit. It is understood that the control unit supplies the wet clutch with hydraulic fluid, or second fluid, via the hydraulic conduit. Each of the shafts upon which a wet clutch is centered, or positioned, may be hollow, or have a hollow interior, and each hydraulic conduit may extend from outside the gearbox case to the wet clutch via the hollow shaft, or the hollow interior of the shaft, and optionally via a rotary union, hydraulic lead through, or rotary-transmission lead through, providing a fluid passage from outside the gearbox case to inside the shaft, or to the hollow interior of the shaft.

The control unit may comprise a valve arrangement coupled to the second pump and the hydraulic conduits. Each wet clutch may be individually coupled to the valve arrangement by a hydraulic conduit. The valve arrangement may be configured to regulate the flow of the second fluid, for example by turning the flow on and off. This way, the operation of each wet clutch can be individually controlled by the pump and the valve arrangement.

The control unit may be configured to individually engage or disengage each wet clutch upon receiving a command signal, such as an electronic or digital signal. The command signal may be generated following manual action, for example by the actuation of paddles causing the gearbox to function in a semi-automatic transmission. Alternatively, the command signal may be automatically generated, such as in an automatic transmission. The wet clutches may be configured to release the second fluid within the first enclosed space, for example to relief pressure when deactivated.

The starter-gear wheel being rigidly attached to the first shaft in combination with the second pump being operationally connected to the first shaft means that the second pump can generate a pressure in the second fluid by a starter motor alone, which means that the wet clutches can be operated without the engine operating.

The bevel gear or differential of the gearbox may constitute a final drive of the powertrain according to the second aspect of the proposed technology. A final drive is understood to provide the last torque conversion prior to providing the torque to the drive wheels.

The internal combustion engine in the second aspect of the proposed technology may have an output shaft, or crankshaft, wherein the first shaft, or the first end of the first shaft, is rotationally fixed, or rigidly attached, to the output shaft, for example by a spline joint, or a spline connection.

The road vehicle according to the third aspect of the proposed technology may comprise a pair of drive wheels individually connected to the final drive, or the first and second gear-output shaft. Alternatively, each wheel of the pair of drive wheels may be individually connected to the first and second gear-output shaft of the differential.

In the gearbox of the first aspect of the proposed technology, the first shaft, second shaft, and third shaft may not be permanently rotationally locked, or can rotate freely with respect to one another when all gear assemblies, or the wet couplings of all the gear assemblies, are disengaged. This allows for a multiplicative number of gears. For example, if there are two gear assemblies in the first set and two gear assemblies in the second set, the total number of gears is four, and if there are three gear assemblies in the first set and two gear assemblies in the second set, the total number of gears is six. The multiplicative number of gears would not be possible if the shafts were permanently locked to one another.

A gear assembly of the first set, or a first gear assembly, providing the lowest gear ratio between the second shaft and the first shaft may provide a gear ratio that is less than one. A high-performance car is typically torque limited by the road contact of the drive wheels at low gears and by the engine at high gears, or at the highest gear. The specified gear ratio contributes to reduced rotational speed of the first axis at top speeds, which in turn contributes to a reduced drag between the clutch plates in the other gear assemblies of the first set. The power loss in the gearbox is then reduced and a faster top speed is possible. It is particularly advantageous in combination if there is a reverse-gear assembly having a wet clutch and connecting the first shaft and the second shaft.

A gear assembly of the second set, or a second gear assembly, providing the lowest gear ratio between the third shaft and the second shaft may provide a gear ratio that is less than one. This is particularly advantageous in combination with a gear assembly of the first set, or a first gear assembly, providing a gear ratio that is less than one. The rotational speed of the first axle at top speed is then further reduced, which contributes to less drag losses in the gearbox.

A gear assembly of the second set may provide a gear ratio between the third shaft and the second shaft that is greater than the gear ratios between the second shaft and the first shaft provided by all gear assemblies of the first set. Additionally, a gear assembly of the second set may provide a gear ratio between the third shaft and the second shaft that is smaller than the gear ratios between the second shaft and the first shaft provided by all gear assemblies of the first set.

The first gear assembly providing the highest gear ratio, and/or a gear ratio greater than one, between the second shaft and the first shaft may have its wet clutch centered, or positioned, on the second shaft. The first gear assembly providing the lowest gear ratio, and/or a gear ratio less than one, between the second shaft and the first shaft may have its wet clutch centered, or positioned, on the first shaft. Similarly, the second gear assembly providing the highest gear ratio, and/or a gear ratio greater than one, between the third shaft and the second shaft may have its wet clutch centered, or positioned, on the third shaft. The second gear assembly providing the lowest gear ratio, and/or a gear ratio less than one, between the third shaft and the second shaft may have its wet clutch centered, or positioned, on the second shaft. This typically has the effect of reduced differences in rotational speeds between clutch plates when the wet clutch is disengaged or open, which contributes to a reduced drag and power loss in the wet clutch. This effect is typically greater for the first gear assemblies, since the difference in rotational speeds is generally greater between the first shaft and the second shaft than between the second shaft and the third shaft. On the other hand, the proposed positions of the wet clutches typically have the effect of an increased torque between clutch plates when the wet clutch is engaged or closed, which contributes to an increased wear on the wet clutch.

The second gear assembly providing the lowest gear ratio between the third shaft and the second shaft may be the only gear assembly of the second set that has its wet clutch centered, or positioned, on the second shaft. Alternatively, only a single second gear assembly may have its wet clutch centered, or positioned, on the second shaft. Alternatively, each second gear assembly may be centered on, or mounted on, the third shaft. This contributes to a more compact gearbox, since the number of gear wheels on the second shaft is the sum of the number of gear wheel on the first and third shaft, which means that there is little space along the second shaft that is available for wet clutches.

The wet clutches of the first gear assembly and the second gear assembly may be of the same type and manufacture, or they may have the same, or approximately the same, operational characteristics.

Here, and throughout these specifications, a gear ratio is understood as corresponding to the number of teeth of an output gear wheel over the number of teeth of a meshing input gear wheel. For example, in a gear assembly of the first set, the gear ratio corresponds to the number of teeth of the second gear wheel over the number of teeth of the first gear wheel. Similarly, in a gear assembly of the second set, the gear ratio corresponds to the number of teeth of the fourth gear wheel over the number of teeth of the third gear wheel.

A first gear assembly may define, or have, a gear ratio that is less than one. A second gear assembly may define, or have, a gear ratio that is less than one. In combination, this allows for a gearbox having several gear shift settings and simultaneously a significant overdrive capacity, which is advantageous for high performance vehicles, or for reduced fuel consumption when coasting at high speeds.

For each gear assembly, one of the gear wheels may be rotationally fixed relative, or rigidly attached, to the shaft it is centered on, and the other, or another, gear wheel of the same gear assembly may be a rotationally supported gear wheel that can rotate relative to the shaft it is centered on. The wet clutch of the gear assembly is then centered, or positioned, on the same shaft as the rotationally supported gear wheel and operationally connects the rotationally supported gear wheel to the shaft it is centered, or positioned, on.

The gear assembly, or wet clutch, being disengaged, or open, means that the rotationally supported gear wheel can rotate, or spin freely, relative to the shaft it is centered on. The gear assembly, or wet clutch, being engaged, or closed, means that the wet clutch releasably locks the rotationally supported gear wheel to the shaft it is centered, or positioned, on. To be more specific, the wet clutch being engaged is understood as the wet clutch transferring or conveying some or all torque supplied to it. This encompasses the wet clutch being rigidly locked and providing rigid mechanical linkage for torque transfer, but also the wet clutch slipping during disengagement and reengagement. The wet clutch being disengaged is understood as the wet clutch effectively transferring or conveying no torque supplied to it. This encompasses the wet clutch being fully open and providing no mechanical torque transfer. There may be some fluid drag in the wet clutch when it is disengaged. A gear assembly being engaged is understood as its wet clutch being engaged. Similarly, a gear assembly being disengaged is understood as its wet clutch being disengaged.

Here, and throughout these specifications, if not further specified, the term each wet clutch is understood to encompass a wet clutch of each of the gear assemblies of the first and second sets, and optionally a wet clutch of the reverse-gear assembly if forming part of the embodiment. Additionally, if not further specified, the term one of the gear wheels of a gear seat is understood to encompass one of the first gear wheel and the second gear wheel of the gear assemblies of the first set, one of the third gear wheel and the fourth gear wheel of the gear assemblies of the second set, or one of the fifth gear wheel, the sixth gear wheel, and the seventh gear wheel of the reverse-gear assembly.

Each wet clutch, or one or more of the wet clutches, may be a multiple-plate clutch. This allows for a smaller diameter of the wet clutch, which in turn allows for a more compact gear box.

The ratio between the highest and lowest gear ratios of the gear assemblies of the first set may be smaller than the ratio between the highest and lowest gear ratios of the gear assemblies of the second set. This means that in an ordered sequence of gear shifting, all gear assemblies of the first set are activated/deactivated between the activation/deactivation of neighboring gear assemblies of the second set.

The wet clutch of each gear assembly, and in extension the gear assembly as such, may have a disengaged state, a slipping state, and an engaged state. In the disengaged state, the clutch hub and the clutch basket can spin at different speeds and no torque is transferred between the clutch hub and the clutch basket, for example by static or kinetic mechanical friction. There may be some fluid friction between the clutch hub and the clutch basket caused by a lubricant, or coolant, in the wet clutch, which may result in a drag in the disengaged wet clutch. In the slipping state, the clutch hub and the clutch basket can spin at different speeds and torque is transferred between the clutch hub and the clutch basket by kinetic mechanical friction. In the engaged state, the clutch hub and the clutch basket spin at the same speeds and torque is transferred between the clutch hub and the clutch basket by static mechanical friction. It is understood that the abovementioned mechanical friction may be in a clutch pack connecting the clutch hub and the clutch basket.

The control unit may be configured to simultaneously set, or operate, two, or at least two, gear assemblies of the first set in the slipping state at an acceleration of the vehicle, or at an increasing rotational speed of the first shaft, and/or the third shaft, or at a zero rotational speed of the third shaft. It is understood that this is done as one of several settings of the control unit. Heat generated by kinetic friction during acceleration is then distributed between several gear assemblies, or several wet clutches. The dimensions of the wet clutches and associated cooling systems can then be made smaller. This is particularly advantageous if the ratio between the highest and lowest gear ratios of the gear assemblies of the first set is smaller than the ratio between the highest and lowest gear ratios of the gear assemblies of the second set, as is suggested above. The control unit may further be configured to simultaneously set, or operate, one of the gear assemblies of the second set in the engaged state.

The control unit may be configured to simultaneously set, or operate, a gear assembly of the first set in the slipping state and another gear assembly of the first set in the engaged state. It is understood that this is done as one of several settings of the control unit. For example, this may be prior to, or at a shifting of states, of the gear assemblies involved, which contributes to a swift gear shifting.

The control unit may be configured to set, or operate, a gear assembly of the first set in the slipping state, and to simultaneously set, or operate, a gear assembly of the second set in the slipping state. It is understood that this is done as one of several settings of the control unit. For example, this may be at an acceleration of the vehicle, or at an increasing rotational speed of the first shaft, and/or the third shaft, or at a zero rotational speed of the third shaft. This means that the heat generated by kinetic friction during acceleration is distributed between several gear assemblies, or several wet clutches.

The control unit may be configured to short shift the gearbox. The first gear assemblies may constitute a first series of gear assemblies with decreasing gear ratios between the second shaft and the first shaft. The control unit may be configured to, with the first gear assembly having the highest gear ratio in the engaged state, or the slipping state, and with the first gear assembly having the lowest gear ration in the slipping state, or the disengaged state, change the state of the first gear assembly having the highest gear ratio to disengaged, and change first gear assembly having the lowest gear ratio to engaged. This allows for a short-shifting gearbox, provided that there are three or more first gear assemblies.

Similarly, the second gear assemblies may constitute a second series of gear assemblies with decreasing gear ratios between the third shaft and the second shaft. The control unit may be configured to, with the second gear assembly having the highest gear ratio in the engaged state, or the slipping state, and with the second gear assembly having the lowest gear ration in the slipping state, or the disengaged state, change the state of the second gear assembly having the highest gear ratio to disengaged, and change the second gear assembly having the lowest gear ratio to engaged. This also allows for a short-shifting gearbox, provided that there are three or more second gear assemblies.

As mentioned above, each wet clutch may be hydraulically operated and operationally connected to the control unit by a hydraulic conduit. Each wet clutch may be configured to change from being disengaged, or open, to engaged, or closed, at an increase in the pressure of a pneumatic or hydraulic fluid in the pneumatic or hydraulic conduit. Similarly, each wet clutch may be configured to change from being engaged, or closed, to disengaged, or open, at a decrease in the pressure of a pneumatic or hydraulic fluid in the pneumatic or hydraulic conduit. This means that a positive pressure is required to activate a gear assembly, which in turn means that at a loss of pressure there will be no transfer of torque from the first shaft to the output shaft. Further, two gear assemblies of the same set will not be activated if one is already activated and the other one loses pressure, which could cause damage to the gearbox, or even catastrophic failure.

The gearbox may be configured to release, or distribute, a fluid, or liquid, within the first enclosed space, for example for lubricating and cooling rotating parts. Specifically, the gearbox may be configured to release, or distribute, the fluid at the plurality of first gear assemblies, at the plurality of second gear assemblies, and/or at the differential, for example at the gear wheels connecting the shafts, or at bearings supporting rotationally supported gear wheels. As specified above, the differential may be located within the first enclosed space. Worded differently, the gearbox may be configured to supply the fluid to the plurality of first gear assemblies, the plurality of second gear assemblies, and/or the differential.

The gearbox may comprise a sump, or oil sump, and may be configured, or arranged, to collect fluid released, or distributed, within the first enclosed space. For example, the fluid may be the first fluid, the second fluid, and or a mix of the first fluid and the second fluid. The sump may be formed by, or form part of, the gearbox case.

The gearbox may comprise a recirculation system configured, or arranged, to recirculate fluid collected by the sump back to the first enclosed space for release, or distribution, within the first enclosed space.

The sump may be a dry sump. The gearbox may further comprise a reservoir coupled to, or in fluid communication with, the sump. It is understood that the reservoir is configured to store fluid collected by the sump. A deaeration filter may be positioned between dry sump and the reservoir.

The first pump may form part of the recirculation system. The first pump may be coupled to, or in fluid communication with, the sump. The fluid collected by the sump may be supplied to the first pump as the first fluid. If the gearbox has a reservoir, the first pump may be coupled to the reservoir. A particle filter may be positioned between the sump, or the reservoir, and the first pump.

Similarly, the second pump may form part of the recirculation system. The second pump may be coupled to, or in fluid communication with, the sump. This way, the fluid collected by the sump may be supplied to the second pump as the second fluid. If the gearbox has a reservoir, the second pump may be coupled to the reservoir. A particle filter may be positioned between the sump, or the reservoir, and the second pump. This particle filter may be the same as between the between the sump and the first pump.

As specified above, the gearbox may be configured to distribute the first fluid within the first enclosed space. The sump, the first pump, and the gearbox case may jointly form, or form part of, a first fluid loop circulating fluid collected by the sump. This circulated fluid may form the abovementioned first fluid. As also specified above, the wet clutches may be configured to release the second fluid within the first enclosed space. The sump, the second pump, and the gearbox case may jointly form, or form part of, a second fluid loop circulating fluid collected by the sump. This circulated fluid may form the abovementioned second fluid. It is understood that the reservoir, the deaeration filter, and the particle filter may also form part of the first and second fluid loops.

The first pump may be a low-pressure pump. For example, it may be configured to supply, or provide, a pressure up to, or at least up to, 5 bar, 10 bar, or 20 bar. The second pump may be a high-pressure pump. For example, it may be configured to supply, or provide, a pressure at least up to 50 bar, 100 bar, 150 bar, 200 bar, or 250 bar.

The gearbox may comprise a third pump configured to generate a pressure in, and/or a flow of, a third fluid. The third fluid may be a coolant and/or lubricant. The gearbox may be configured to release, or distribute, the third fluid pressurized by the third pump at the differential, for example for lubricating and cooling the differential. The third fluid may be of the same kind as the first fluid and/or the second fluid. This is particularly advantageous in combination with the differential being located within the first enclosed space, or the second enclosed space being in fluid communication with the first enclosed space.

The third pump may form part of the recirculation system. The third pump may be coupled to, or in fluid communication with, the sump. This way, the fluid collected by the sump may be supplied to the third pump as the third fluid. If the gearbox has a reservoir, the third pump may be coupled to the reservoir. A particle filter may be positioned between the sump, or the reservoir, and the third pump. This particle filter may be the same as between the between the sump and the first pump and/or the second pump.

The sump, the third pump, and the gearbox case may jointly form, or form part of, a third fluid loop circulating fluid collected by the sump. This circulated fluid forms the abovementioned third fluid.

The third pump may be a low-pressure pump. For example, it may be configured to supply, or provide, a pressure up to, or at least up to, 5 bar, 10 bar, or 20 bar.

BRIEF DESCRIPTION OF THE DRAWINGS

A more complete understanding of the abovementioned and other features and advantages of the proposed technology will be apparent from the following detailed description of preferred embodiments of the proposed technology in conjunction with the appended drawings, wherein.

DETAILED DESCRIPTION OF THE DRAWINGS

Figure 1:
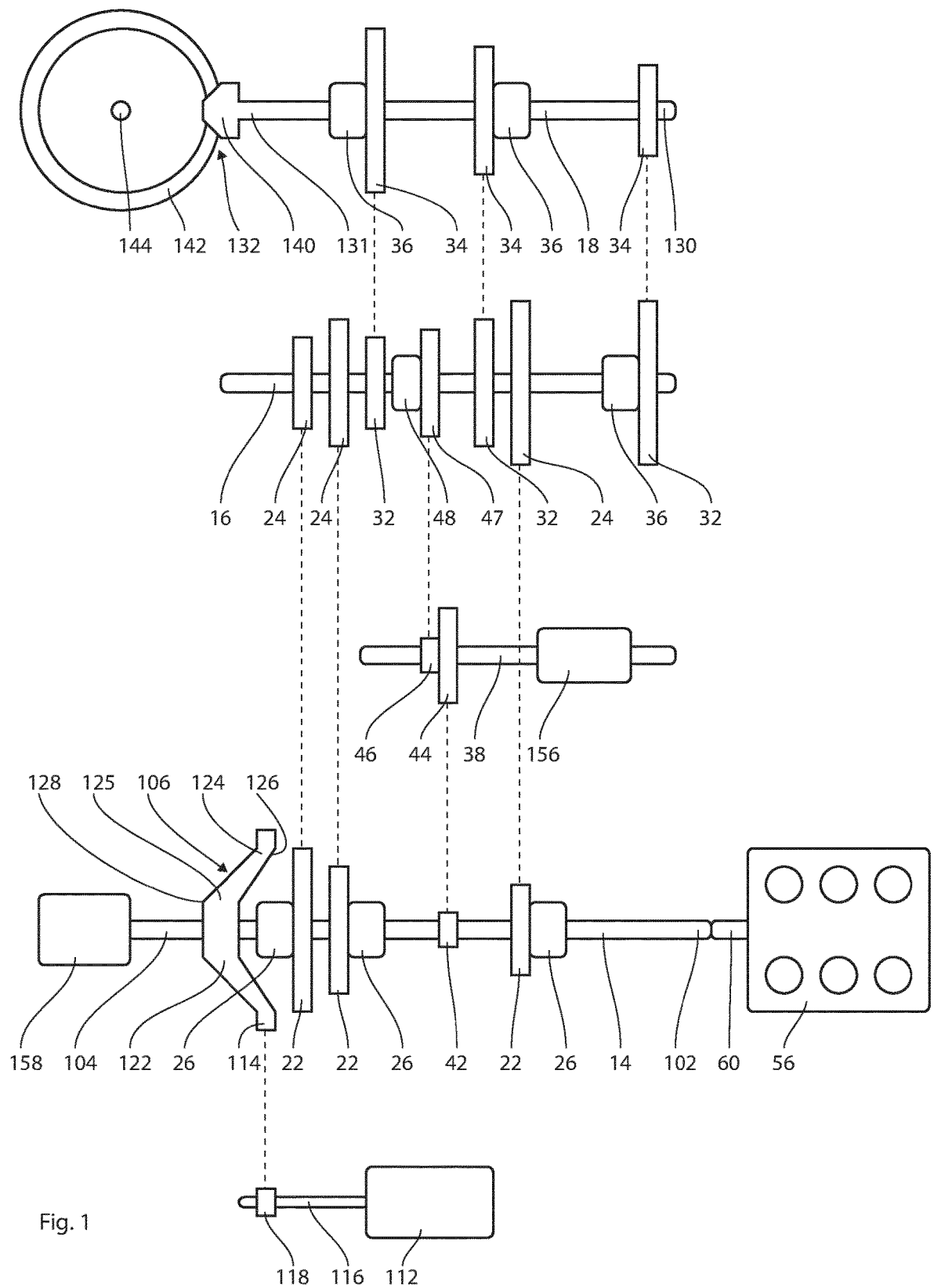
FIG. 1 is an exploded partial view of an embodiment of a gearbox.

FIG. 1 schematically illustrates components of the gearbox 10 in FIGS. 2*a-i*. The gearbox 10 has a first shaft 14, a second shaft 16, and a third shaft 18. The gearbox 10 further has a countershaft 38.

The first shaft 14 receives torque to the gearbox 10 from an engine 56 via a crank shaft 60, and the third shaft 18 delivers torque from the gearbox 10. The second shaft 16 is arranged to transfer torque from the first shaft 14 to the third shaft 18, and vice versa at engine breaking.

The first shaft 14 has a first end 102 and a second end 104. The crank shaft 60 of the engine 56 is permanently connected to the first end 102 of the first shaft 14 of the gearbox 10 without any clutch or torque converting mechanism therebetween, such as a gear set or a torque converter, between the engine 56 and the gearbox 10.

The engine 56 also has no flywheel for the purpose smoothing out the intermittent torque output of the engine 56. Instead, the moment of inertia of the first shaft 14 of the gearbox 10 and the components thereon is sufficient to achieve this function.

A starter-gear wheel 106 is centered and rigidly attached to the first shaft 14, as illustrated in FIG. 1. The starter-gear wheel 106 has a conical portion 122 with a wide end 124 facing towards the first end 102 of the first shaft 14 and a narrow end 125 facing away from the first end 102 of the first shaft 14. This means that the starter-gear wheel 106 has a concave side 126 facing the first end 102 and a convex side 128 facing away from the first end 102. This means that the convex side 128 is facing the second end 104 of the first shaft 14. The starter-gear wheel 106 further forms a starter-ring gear 114 at its outer edge.

FIG. 1 further illustrates three first gear wheels 22, centered, or positioned, on the first shaft 14 between the starter-gear wheel 106 and the first end 102 of the first shaft 14. The first gear wheels 22 differ from each other in diameter. Three wet clutches 26 are also positioned on the first shaft 14 between the starter-gear wheel 106 and the first end 102 of the first shaft 14. Each of the first gear wheels 22 is rotationally supported relative to the first shaft 14 by way of a bearing (not shown). Each wet clutch 26 is adjacent and connected to respective first gear wheel 22. A fifth gear wheel 42 is further positioned on and rotationally fixed to the first shaft 14.

Three second gear wheels 24 are positioned on and rotationally fixed to the second shaft 16. The second gear wheels 24 differ in diameter from each other. Further, three third gear wheels 32 are positioned on the second shaft 16. The third gear wheels 32 differ from each other in diameter. One of the third gear wheels 32 is positioned adjacent and connected to a wet clutch 36. This third gear wheel 32 is rotationally supported relative to the second shaft 16 by a bearing (not shown). The other third gear wheels 32 are fixed to the second shaft 16. An eighth gear wheel 47 is positioned adjacent and connected to a wet clutch 48. Both these components are positioned on the second shaft 16. The eighth gear wheel 47 is rotationally supported relative to the second shaft 16 by way of a bearing (not shown).

The third shaft 18 has a first end 130, and a second end 131. Three fourth gear wheels 36 are centered on the third shaft 18 and differ in diameter from each other. Further, two wet clutches 36 are positioned on the third shaft 18 and connected to two of the fourth gear wheels 36, which are rotationally supported relative to the third shaft 18 by way of bearings (not shown). The third shaft 18 forms a bevel-gear pinion 140 that meshes with a bevel-gear wheel 142. A gear-output shaft 144 is fixed at the center of the bevel-gear wheel. The bevel-gear pinion 140 and the bevel-gear wheel 142 jointly forms a bevel gear 132 that is operationally connected to the third shaft 18.

A sixth gear wheel 44 and a seventh gear wheel 46 are centered on and fixed to the counter shaft 38. A first pump 156 is operationally connected to the counter shaft 38 and generates a pressure and flow of a first fluid at a rotation of the counter shaft 38.

A second pump 158 is operationally connected to the second end of the first shaft 14. The second pump generates a pressure and flow of a second fluid The gearbox further has an electric starter motor 112. A pinion shaft 116 is connected to the rotor (not shown) of the electric starter motor 112. The pinion shaft 116 forms a first pinion 118, which means that first pinion is fixed to and centered on the pinion shaft 116.

The dashed lines in FIG. 1 show which components cooperate or meshes with each other. For example, the dashed lines between the first gear wheels 22, positioned on the first shaft 14, and the second gear wheels 24, positioned on the second shaft 16, show that each of the first gear wheels 22 cooperates with a respective second gear wheel 24. Thus, each second gear wheel 24 is connected to a first gear wheel 22 that in turn is connected to a wet clutch 26. These three components jointly form a first gear assembly 20. There are in total three first gear assemblies 20, see FIGS. 2a and 2c When a wet clutch 26 of a first gear assembly 20 is engaged, or closed, the gearbox transfers torque from the first shaft 14 to the second shaft 16 via the first and second gear wheels 22 and 24. When a wet clutch 26 of a first gear assembly 20 is disengaged, or open, the gearbox transfers no torque from the first shaft 14 to the second shaft 16 via the first and second gear wheels 22 and 24 of the same gear assembly 20, since the first gear wheels 22 are rotationally supported relative to the first shaft 14.

Further, the dashed lines between the third gear wheels 32, positioned on the second shaft 16, and the fourth gear wheels 34, positioned on the third shaft 18, show that each of the third gear wheels 32 meshes with a respective fourth gear wheel 34. Either the third gear wheel 32 or the fourth gear wheel 34 of each pair is connected to a wet clutch 34, as illustrated in FIG. 1, thus jointly forming a second gear assembly 30, see FIG. 2e. When a wet clutch 36 of a second gear assembly 30 is engaged, or closed, the gearbox transfers torque from the second shaft 16 to the third shaft 18 via the third and fourth gear wheels 32 and 34. When a wet clutch 36 of a second gear assembly 30 is disengaged, or open, the gearbox transfers no torque from the second shaft 16 to the third shaft 18 via the third and fourth gear wheels 32 and 34 of the same gear assembly 30.

The fifth gear wheel 42 meshes with the sixth gear wheel 44, which is indicated in FIG. 1 by the dashed line between the fifth gear wheel 42, positioned on the first shaft 14, and the sixth gear wheel 44, positioned on the counter shaft 38. The seventh gear wheel 46 meshes with and the eighth gear wheel 47 that is connected to the wet clutch 48, which is indicated by the dashed line between the seventh gear wheel 46, positioned on the counter shaft 18, and the eighth gear wheel 47, positioned on the second shaft 16. The fifth gear wheel 42, the sixth gear wheel 44, the seventh gear wheel 46, the eighth gear wheel 47, and the wet clutch 48 together form a reverse-gear assembly 40. The wet clutch 48 can engage the reverse-gear assembly 40 so that torque is transferred from the first shaft 14 to the second shaft 16 via the fifth gear wheel 42, the sixth gear wheel 44, the seventh gear wheel 46, and the eighth gear wheel 47. When the wet clutch 48 is disengaged, torque is transferred only to the second shaft 16 via the reverse gear assembly 40. This means that the reverse gear assembly 40 operationally connects the first shaft 14 and the second shaft 16 via the counter shaft 38. When engaged, the reverse gear assembly 40 turns the second shaft 16 in the opposite direction relative to an engagement of one of the first gear assemblies 20.

If the wet clutch 26 of one of the first gear assemblies 20 and the wet clutch 36 of one of the second gear assemblies 30 are engaged and all other wet clutches 26 and 36 are disengaged, torque will be transferred from the first shaft 14 to the third shaft 18. The torque is also converted, and the conversion depends on which of the wet clutches 26 and 36 that are engaged.

If all the wet clutches 26 of the first gear assemblies 20 are disengaged, no torque will be transferred from the first shaft 14 to the third shaft 18. Similarly, if all the wet clutches 36 of the second gear assemblies 30 are disengaged, no torque will be transferred from the first shaft 14 to the third shaft 18. There are no other mechanisms for transferring torque between the first shaft 14 and the third shaft. This means that the gearbox 10 does not convert, or convey, a torque received by the first shaft 14 to a torque delivered by the third shaft 18 if no wet clutch 26 or 36 of the gear assemblies 20 or 30 is engaged. This also means that none of the shafts 14, 16, and 18 are permanently rotationally locked with respect to one another.

Schematic cross-sections of an embodiment of the proposed gearbox 10 are illustrated in FIGS. 2 a-i. The Figures show the gearbox 10 from different views. The relative positions of the different shafts are indicated to the right of each cross-section. The arrow indicates the viewing direction of the schematic cross-section. The dashed line, in connection to the arrow, represents the plane defining the orientation and position of the cross section. The circles, having solid contour lines and reference numbers, indicate the shafts that are visible in the cross-section. The circles, having dashed contour lines and no reference number, indicate the shafts that are not illustrated in the cross-section. For example, the FIG. 2a only shows the first and the second shafts 14 and 16.

As shown in FIGS. 2 a-i, the gearbox 10 has a gearbox case 12 that encapsulates and provides mechanical support for the mechanical components of the gearbox 10. The gearbox case 12 forms a first enclosed space 134 that is fluid-tight and in which the different gear assemblies 20, 30, and 40 are located. The components described in relation to FIG. 1 are indicated. The gearbox case 12 is a liquid-tight container and holds an oil that lubricates and cools the mechanical components of the gearbox 10. The gearbox case 12 forms a dry sump 166 and the gearbox 10 has a valve (not shown) for handling pressure changes within the gearbox case 12, for example due to heat expansion. In alternative embodiments, the gearbox 10 has a semi-dry sump or a wet sump. The lubricating liquid is de-aired and circulated to an external cooler (not shown) and buffered in a reservoir (not shown), see further the discussion in relation to FIGS. 5a-c.

Figure 2A:
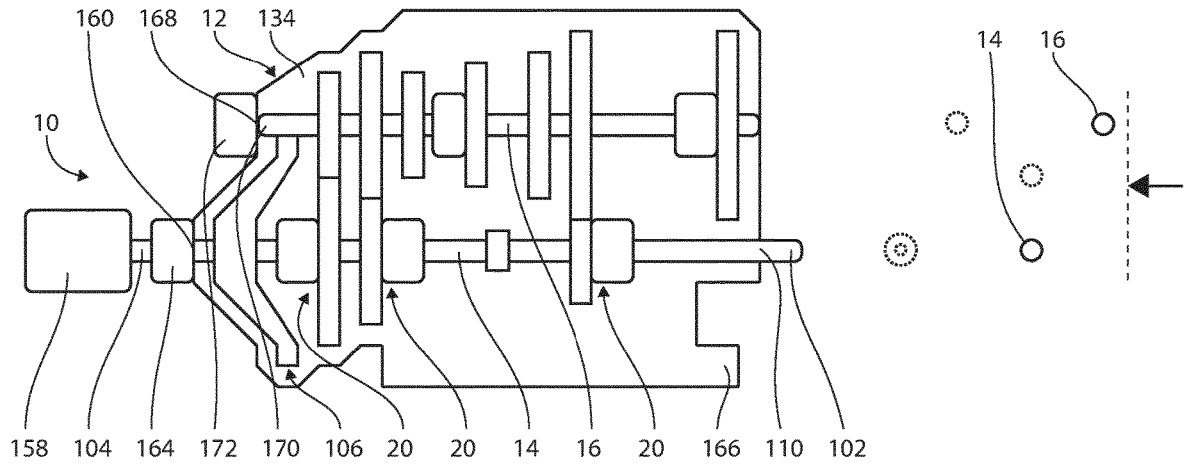
FIGS. 2*a-i* illustrate cross-sectional views of an embodiment of a gearbox.

FIG. 2a shows the first shaft 14 and the second shaft 16 positioned in the gearbox case 12. The first end 102 of the first shaft 14 is extending through a first first-shaft aperture 110. The second end 104 of the first shaft 14 is extending through the second first-shaft aperture 160. The second end 170 of the second shaft 16 is accessible through a second-shaft aperture 168. A first rotary union 164 is positioned adjacent to the second first-shaft aperture 160 and connected to the first shaft 14. A second rotary union 172 is positioned adjacent to the second-shaft aperture 168 and connected to the second end 170 of the second shaft 16. The first rotary union 164 leads the second fluid from outside the gearbox case to inside the first shaft 14. Similarly, the second rotary union 172 leads the second fluid from outside the gearbox case to inside the second shaft 16.

Figure 2B:
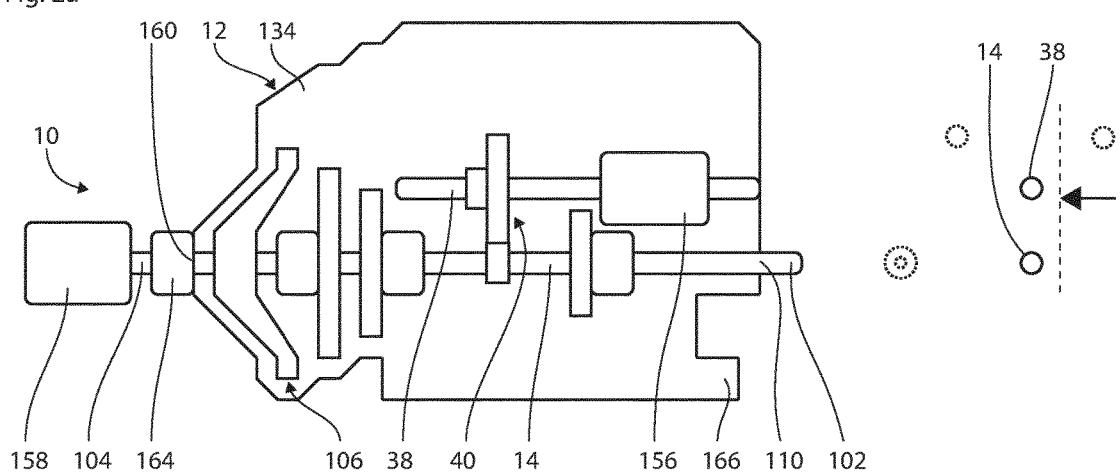

FIG. 2b shows the first shaft 14 and the counter shaft 38. The above-mentioned components connected to the respective shaft, according to description of FIG. 1, are positioned inside the gearbox case 12. FIG. 2b illustrates how the fifth gear 42 and the sixth gear 44 of the reverse gear assembly 40 mesh.

Figure 2C:
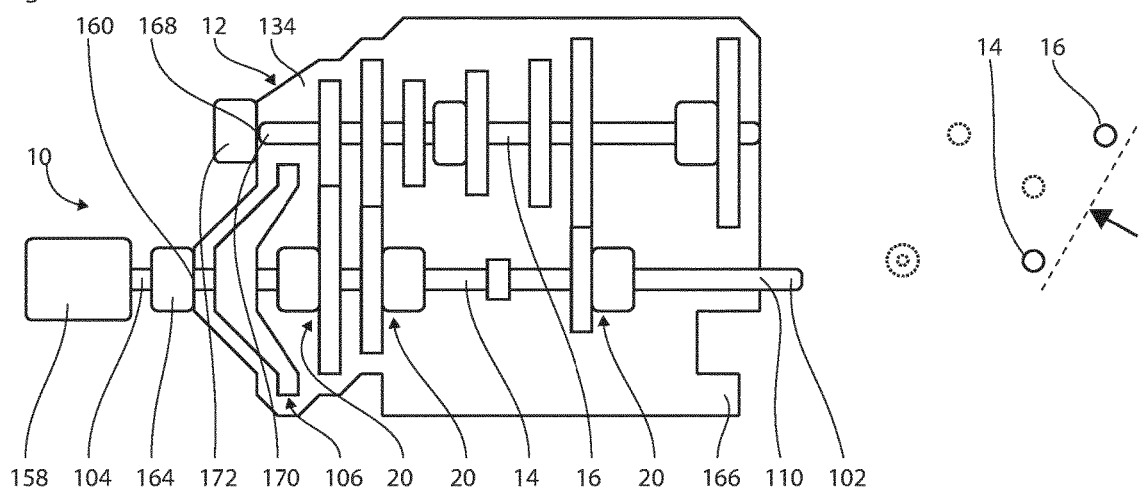

FIG. 2c shows the first shaft 14 and the second shaft 16 positioned relative to the gearbox case 12. The above-mentioned components connected to the respective shaft are positioned inside the gearbox case 12. The second end 170 of the second shaft 16 is extending through the second-shaft aperture 168, as described in relation to FIG. 2a.

Figure 2D:
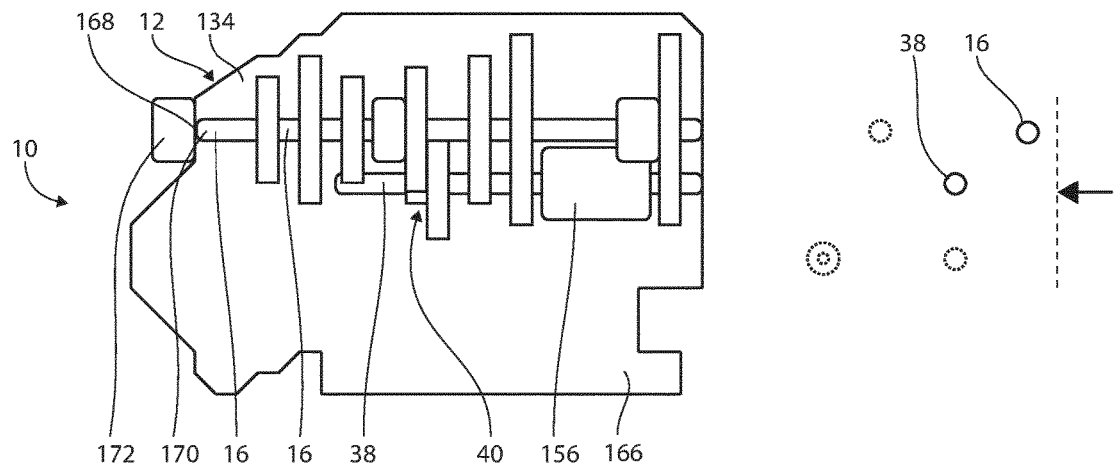

FIG. 2d shows the second shaft 16 and the counter shaft 38 positioned relative to the gearbox case 12. The above-mentioned components connected to the respective shaft are positioned inside the gearbox case 12. FIG. 2d shows the meshing of the seventh gear 46 and the eighth gear 48 of the reverse gear assembly 40.

Figure 2E:
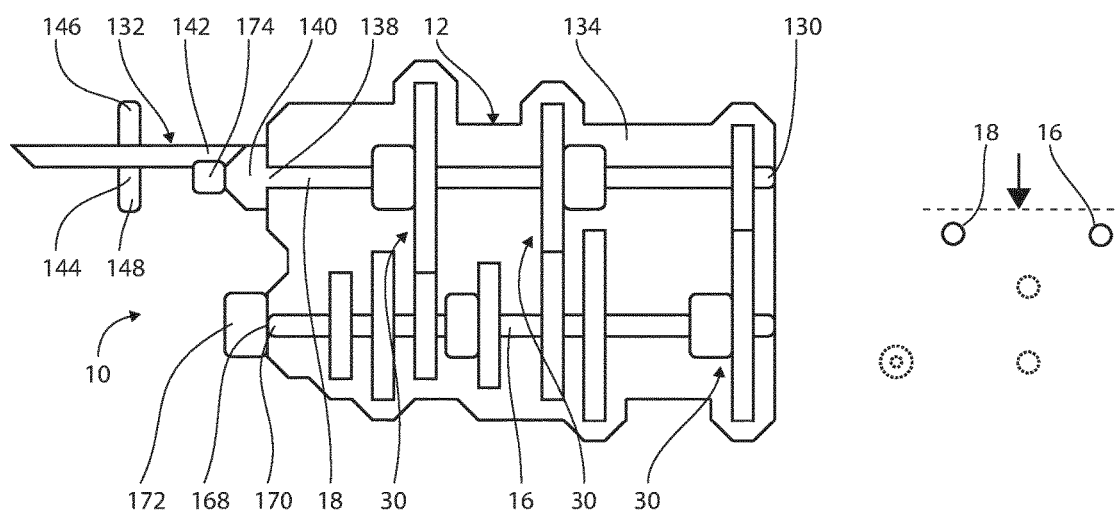

FIG. 2e shows the second shaft 16 and the third shaft 18 positioned relative to the gearbox case 12. The first end 131 of the third shaft 18 extends through the gearbox case 12 through a third-shaft aperture 138. The above-mentioned components connected to the respective shaft are present. FIG. 2e further shows the bevel-gear pinion 140 engaging the bevel-gear wheel 142 positioned outside the gearbox case 12. The gear-output shaft 144, having a first and 146 and a second end 148, extends from the bevel-gear wheel 142 at a right angle to the third shaft 18.

A third rotary union 174 is positioned at the third-shaft aperture 138 and connected to the bevel-gear pinion 140 formed by the third shaft 18. The third rotary union 174 leads the second fluid from outside the gearbox case to inside the third shaft 18.

Figure 2F:
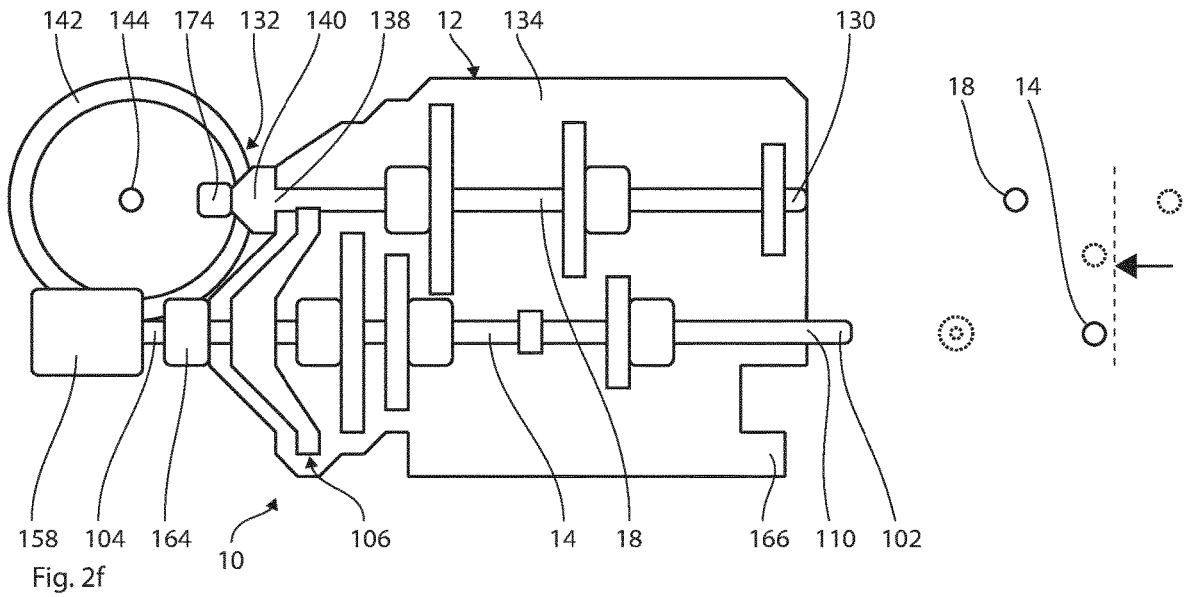

FIG. 2f shows the first shaft 14 and the third shaft 18. The above-mentioned components connected to the respective shaft are shown. The first end 102 of the first shaft 14 extends through the first first-shaft aperture 110. The second end 104 of the first shaft 14 extends through the second first-shaft aperture 160. FIG. 2f further shows the bevel-gear pinion 140 engaging the bevel-gear wheel 142, together forming the bevel gear 132. Further, the gear-output shaft 144 is also shown.

Figure 2G:
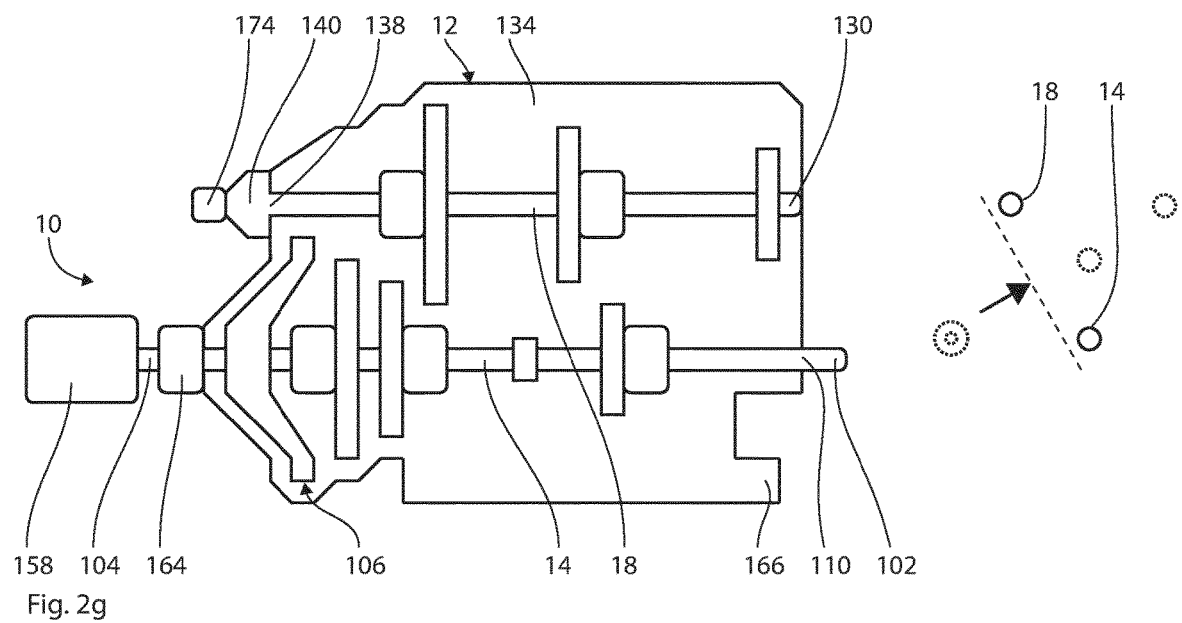

FIG. 2g corresponds to FIG. 2f, but from a different perspective as indicated to the right of the cross-section.

Figure 2H:
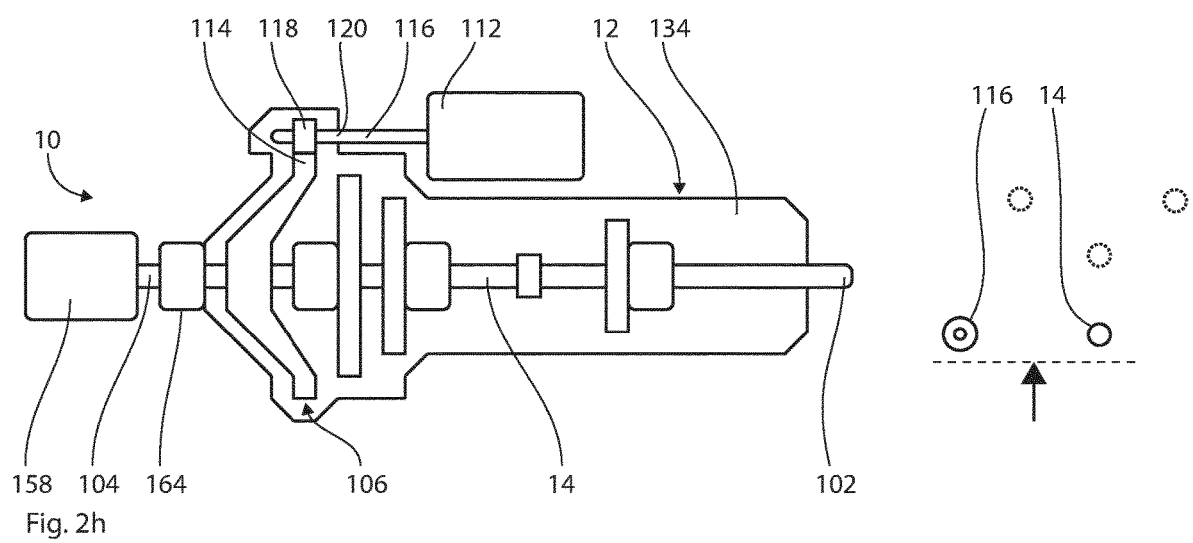

FIG. 2h shows the first shaft 14 and the starter motor 112. The starter-gear wheel 106 is engaged by the first pinion 118. The starter motor 112 is positioned outside the gearbox case 12. The pinion shaft 116 extends from the starter motor 112 into the gearbox case 12 through a pinion-shaft aperture 120. This way, torque from the starter motor can be transferred from outside the gearbox case 12 to the crank shaft 60 of the engine 56 via the pinion shaft 116, the first pinion 118, the starter-gear wheel 106 and the first shaft 14, see further FIG. 1.

Figure 2I:
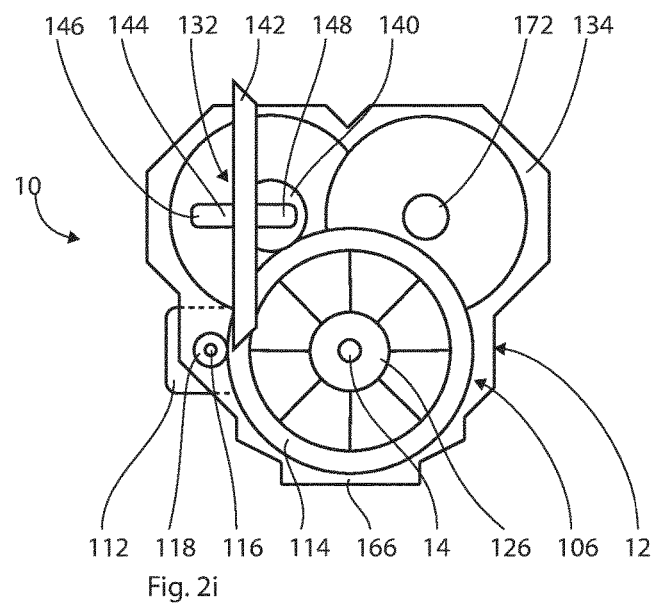

FIG. 2i is a schematic cross-sectional view of the gearbox 10 viewed from the second end 104 of the first shaft 14.

Figure 3A:
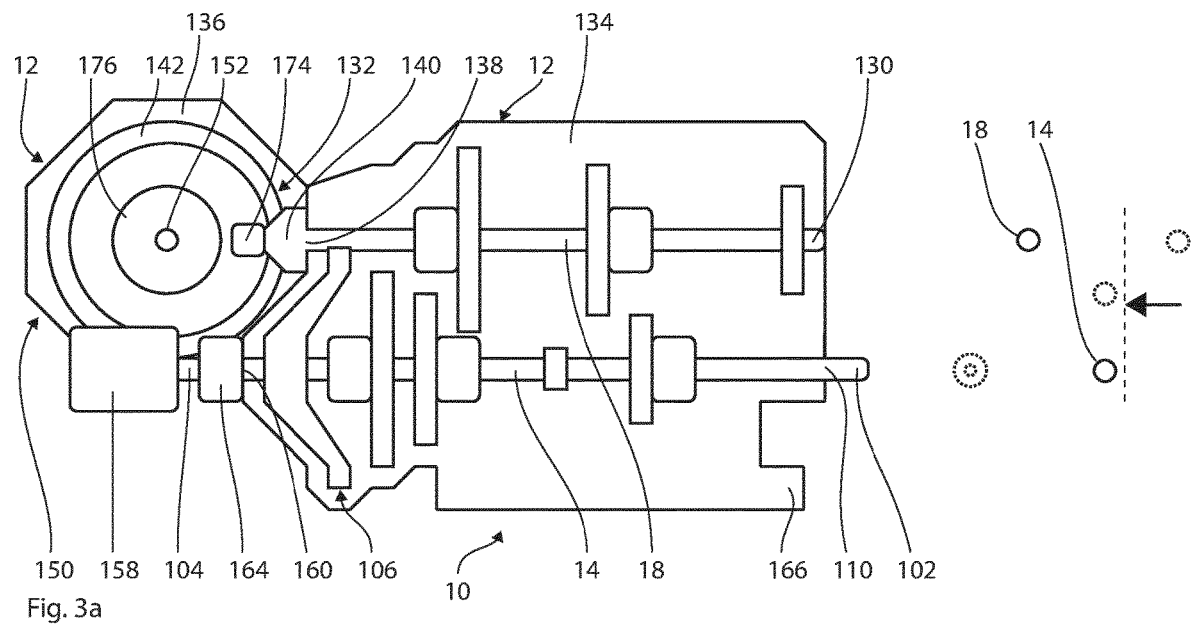
FIGS. 3*a-c* illustrate cross-sectional views of an alternative embodiment of a gearbox.
Figure 3B:
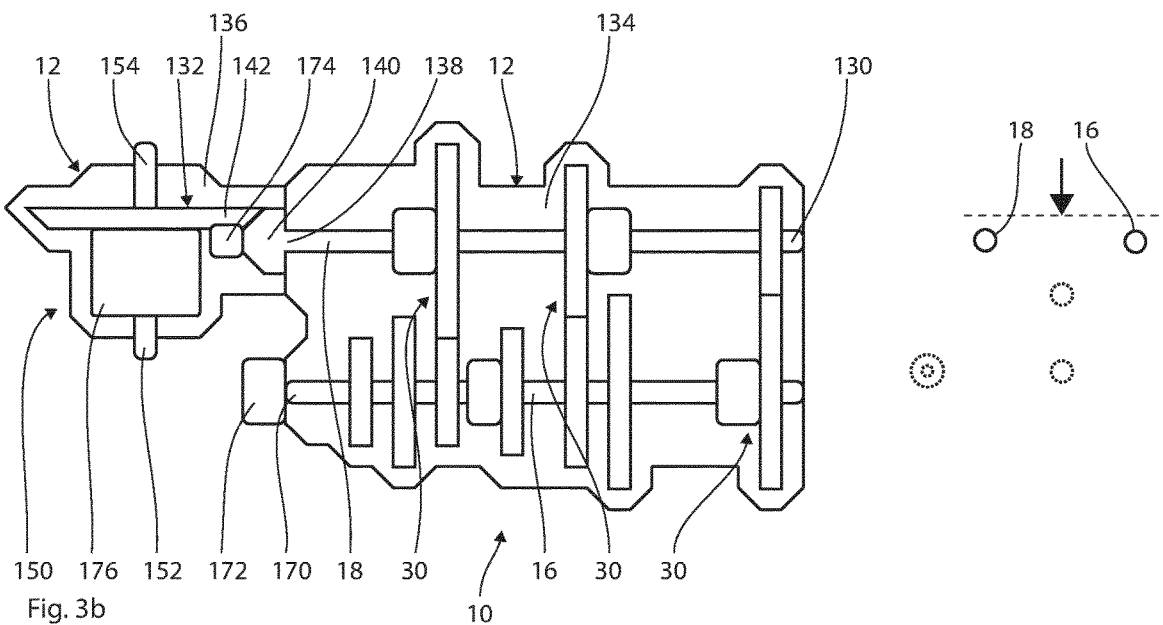
Figure 3C:
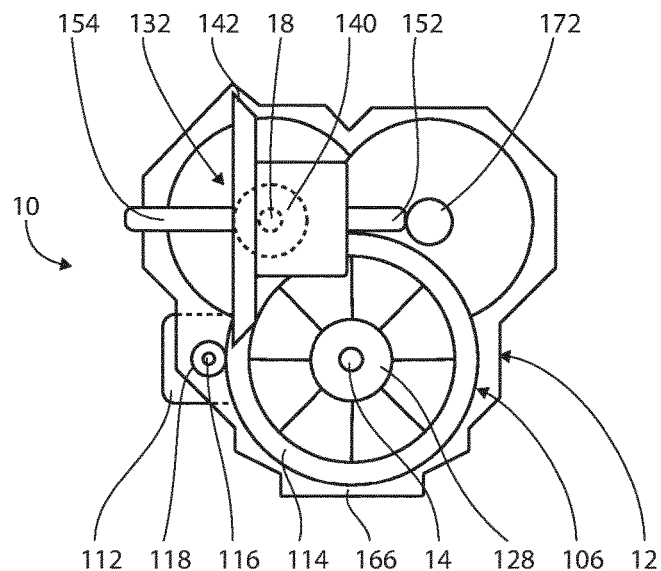

Details of an alternative embodiment of the proposed gearbox 10 are schematically illustrated in FIGS. 3a-c. The Figures show the gearbox 10 of the proposed technology from different views. The orientation of the cross-section is indicated to the right of FIGS. 3a and 3b. For example, FIG. 3a shows only the first and the third shafts 14 and 18.

The FIGS. 3a, b, and c correspond to FIGS. 2f, 2e and 2i. This embodiment differs in that the gearbox 10 has a differential and the bevel gear 132 forms part of a differential 150 having a first gear-output shaft 152 and a second gear-output shaft 154 connected to the bevel-gear wheel 142 by way of a carrier 176 and an arrangement of planet and sun gears (not shown). The first and second gear-output shafts 152 and 154 extend from the gearbox case 12 can rotate at different rates and deliver torque from the gearbox 10.

In addition to the first enclosed space 134 in which the different gear assemblies 20, 30, and 40 are located, the gearbox case 12 also forms a second enclosed space 136 that is fluid-tight and in which the differential 150 is located. The second enclosed space is separate from the first enclosed space 134 preventing any fluid passing therebetween, such as a differential oil in the second enclosed space 134 entering the first enclosed space 134. This way, fluids in the first enclosed space 134 and the second enclosed space 136 are not mixed. In alternative embodiments the second enclosed space 136 is joined to the first enclosed space 134 and jointly forms a single enclosed space. Such an embodiment is further described in relation to FIGS. 5a-c.

Figure 4:
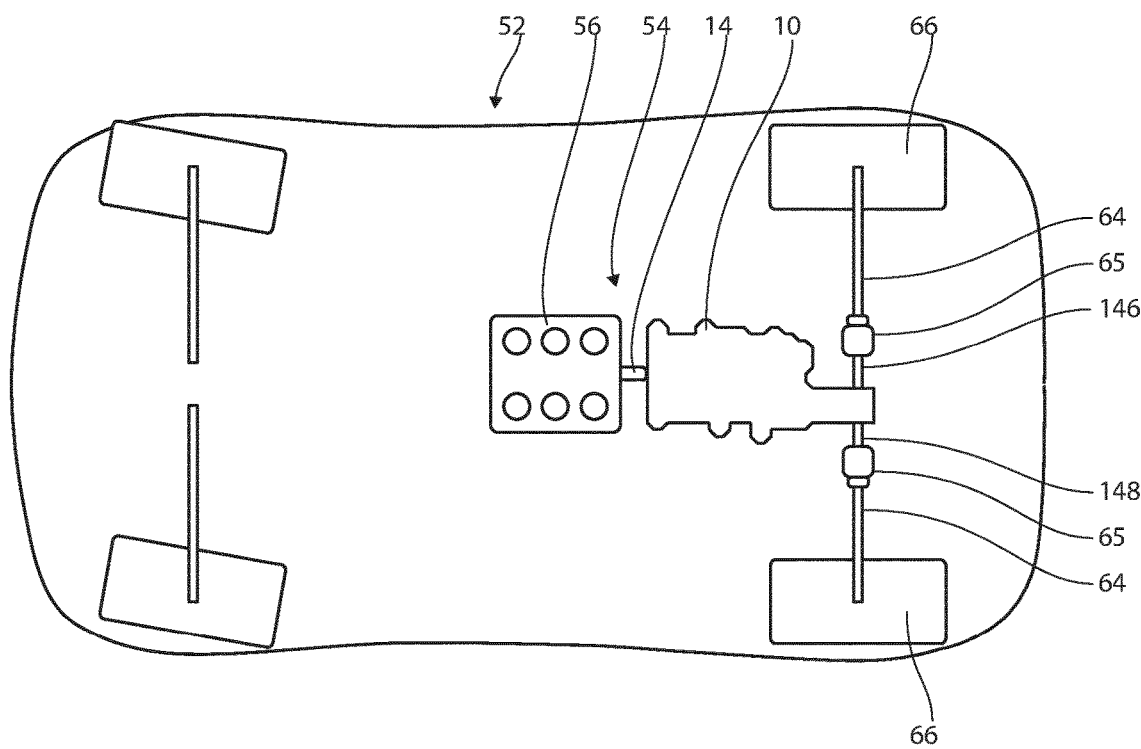
FIG. 4 illustrates an embodiment of a road vehicle.

FIG. 4 schematically illustrates a road vehicle 52 in the form of a car. The road vehicle 52 has an internal combustion engine 56 and the gearbox described in relation to FIGS. 2a-i. The first shaft 14 of the gearbox 10 is connected directly to the engine without any mechanical components therebetween, as shown in FIG. 1. Each of the first end 146 and the second end 148 of the gear-output shaft 144 is connected to a drive axle 64 by way of a wet clutch 65. Each drive axle 64 is in turn connected to a rear wheel 66. The wet clutches 65 allow for torque vectoring. Additionally, they also allow for the rear wheels 66 to rotate at different speed, for example when turning. The engine 56, gearbox 10, wet clutches 65 and drive axels 65 form part of a powertrain 54 of the vehicle 10.

Figure 5A:
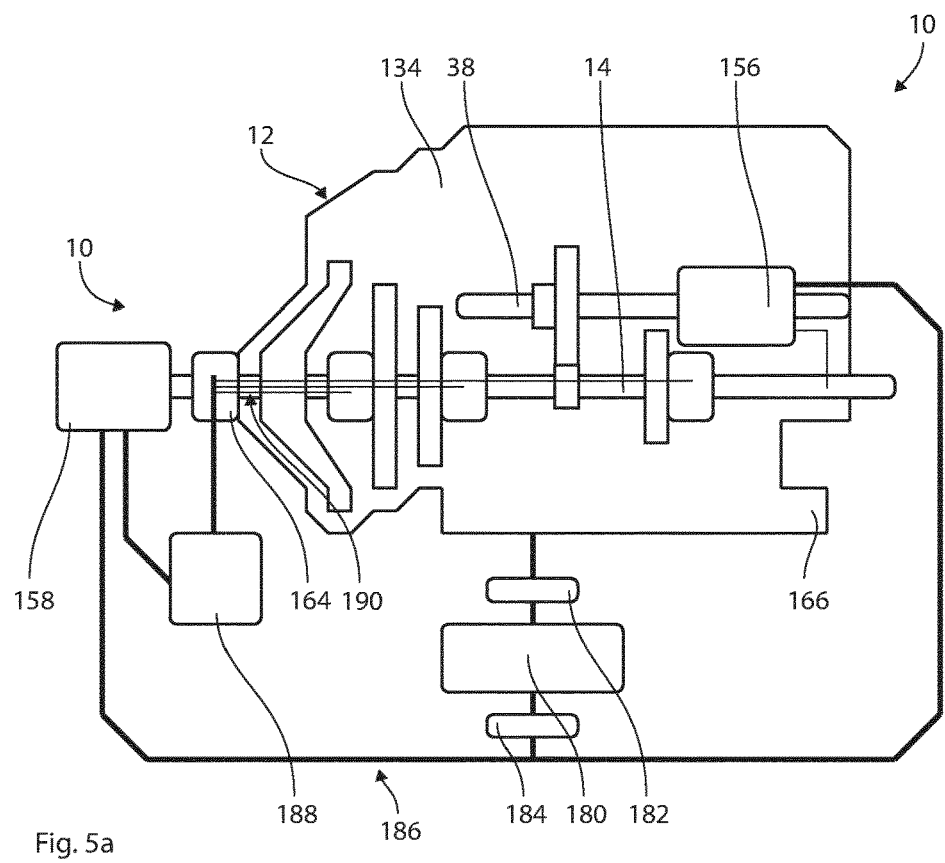
FIGS. 5*a-c* illustrate cross-sectional views of an alternative embodiment of a gearbox.
Figure 5B:
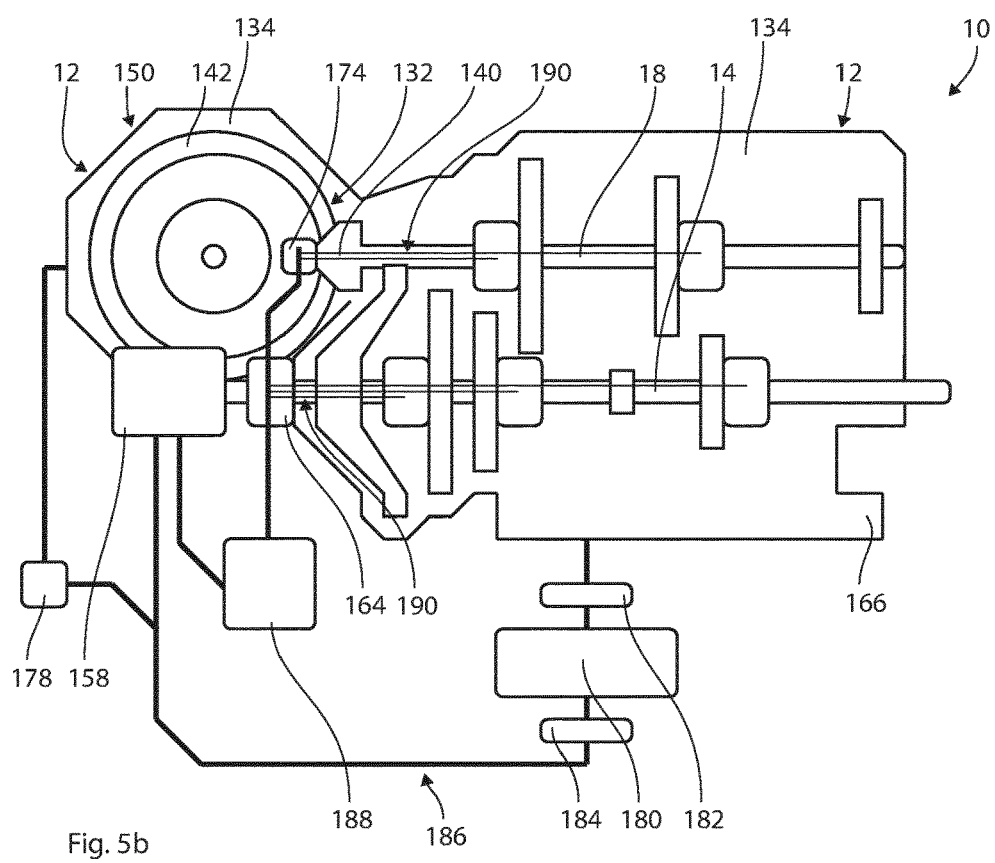
Figure 5C:
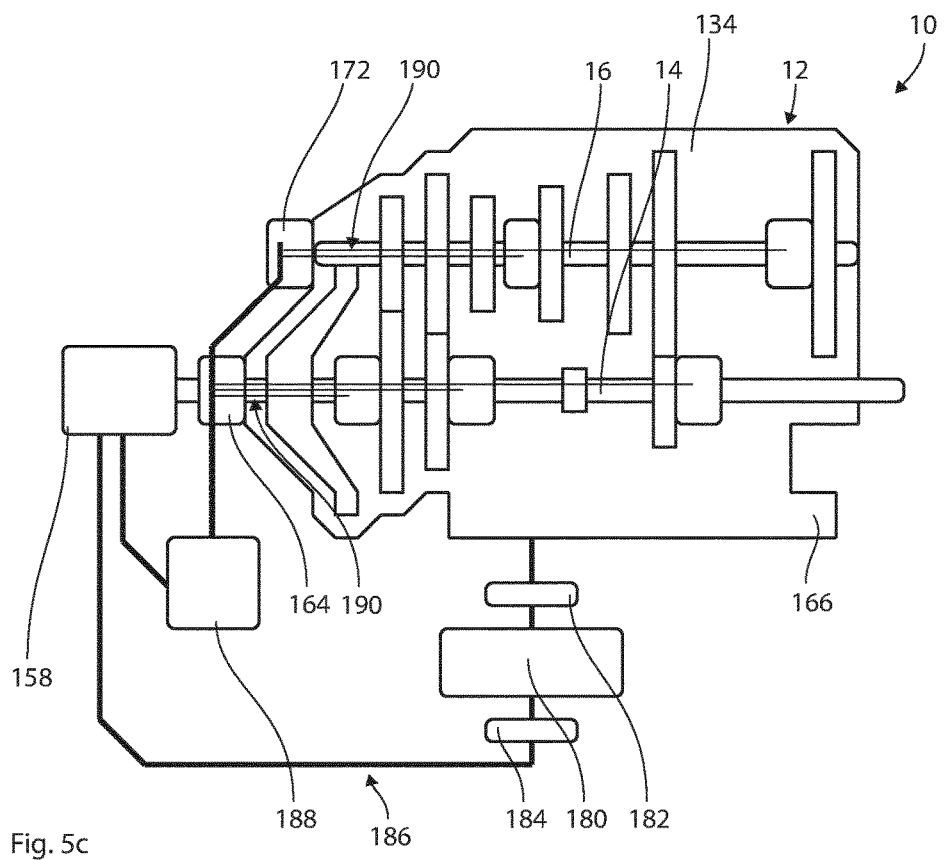

FIGS. 5a-c illustrate an alternative embodiment of a gearbox 10. FIG. 5a corresponds to the view in FIG. 2b, FIG. 5b corresponds to the view in FIG. 2f, and FIG. 5c corresponds to the view in FIG. 2a. The alternative embodiment has the features of the gearbox 10 described in relation to FIGS. 3a-c and differs in that the gearbox case 12 does not form a second enclosed space and that the differential is located within the first enclosed space 136 together with the first and second gear assemblies 20 and 30.

The gearbox 10 is configured to release the first fluid pressurized by the first pump 156 at the first gear assemblies 20 and the second gear assemblies 30 for lubricating and cooling the rotating components of the gear assemblies 20 and 30. The second fluid is used as a hydraulic fluid for controlling the operation of the wet clutches 26 and 36, see further FIG. 1. The wet clutches 26 and 36 of the gear assemblies 20 and 30 release the second fluid within the first enclosed space 134 to relief pressure when the wet clutches 26 and 36 are disengaged or opened. The gearbox 10 also has a third pump 178 that generates a pressure in a third fluid that is released via nozzles at the differential 150 for lubricating and cooling the rotating components of the differential 150. This means that the first, second, and third fluids are mixed in the first enclosed space 134. In another embodiment, the first fluid is also released at the differential 150 instead of the third fluid. All fluids are of the same type of synthetic oil.

Each shaft 14, 16, and 18 has a hollow interior, see further FIG. 1. The first pump 156 is in fluid communication with the hollow interior of each shaft 14, 16, and 18, and the first fluid is transferred from the first pump 156 to the gear assembly via the hollow interior of the shaft 14, 16, and 18 and is released into the first enclosed space 134 at the gear assemblies 20 and 30 via apertures (not shown) in the shafts 14, 16, and 18 and via the wet clutches 26 and 36, see further FIG. 1. In alternative embodiments, the first fluid is released into the first enclosed space 134 via nozzles.

The second pump 158 is in fluid communication with the wet clutch 26 or 36 of each gear assembly 20 or 30 via a hydraulic conduit 190 that extend from outside the gearbox case 12 via the rotary unions 164, 172, or 174 and the hollow interior of the shaft 12, 13, or 14. The second fluid is released into the first enclosed space 134 by the wet clutches 26 and 36, as described above.

The first pump 156 and the third pump 176 employed for lubrication and cooling are low-pressure pumps, while the second pump 158 employed for hydraulic control of the wet clutches 26 and 36 is a high-pressure pump.

The dry sump 166 formed by the gearbox case 12 collects the fluids that are released within the first enclosed space 134. This means that the first, second, and third fluids are mixed within the enclosed space 134 and in the sump 166. The fluids are a synthetic oil of the same type.

The gearbox 10 has a recirculation system 186 that recirculate fluids collected by the sump 166 back to the first enclosed space 134 for release within the first enclosed space 134. The gearbox 10 has a reservoir 180 in fluid communication with the sump 166 that stores the fluid collected by the sump 166. A deaeration filter 182 is positioned between sump 166 and the reservoir 180. The first pump 156, the second pump 158, and the third pump 178 are in fluid communication with the reservoir 180, which means that they are also in fluid communication with the dry sump 166. A particle filter 184 is positioned between the reservoir 180 and each of the pumps 156, 158, and 178. This way, the fluid collected by the sump 166 is supplied to the first pump 156, second pump 158, and third pump 178 as the first fluid, second fluid, and third fluid, respectively. The filters 182 and 184, the reservoir 180, and the pumps 156, 158, and 178 form part of the recirculation system 186.

As explained above, the first fluid, the second fluid, and the third fluid are released and mixed within the first enclosed space 134 formed by the gearbox case 12 and the sump 166 formed by the gearbox case 12 collects the released fluids. The first pump 156 and the gearbox case 12 form part of a first fluid loop circulating the fluid collected by the sump 166 as the first fluid. Similarly, the second pump 158 and the gearbox case 12 form part of a second fluid loop circulating the fluid collected by the sump 166 as the second fluid, and the third pump 178 and the gearbox case 12 form part of a third fluid loop circulating the fluid collected by the sump 166 as the third fluid.

The gearbox further has a control unit 188 located outside the gearbox case 12. The control unit 188 has a valve arrangement (not shown) that is coupled to the second pump 158 and to each of the hydraulic conduits 190, which in turn are connected to the wet clutches 26 and 36 of the gear assemblies 20 and 30. The valve arrangement can regulate the flow of the second fluid from the second pump 158 to each of the wet clutches 26 and 36. This way, the function of the wet clutches 26 and 36 is hydraulically controlled and they can be individually engaged and disengaged by the control unit 188.

Figure 6:
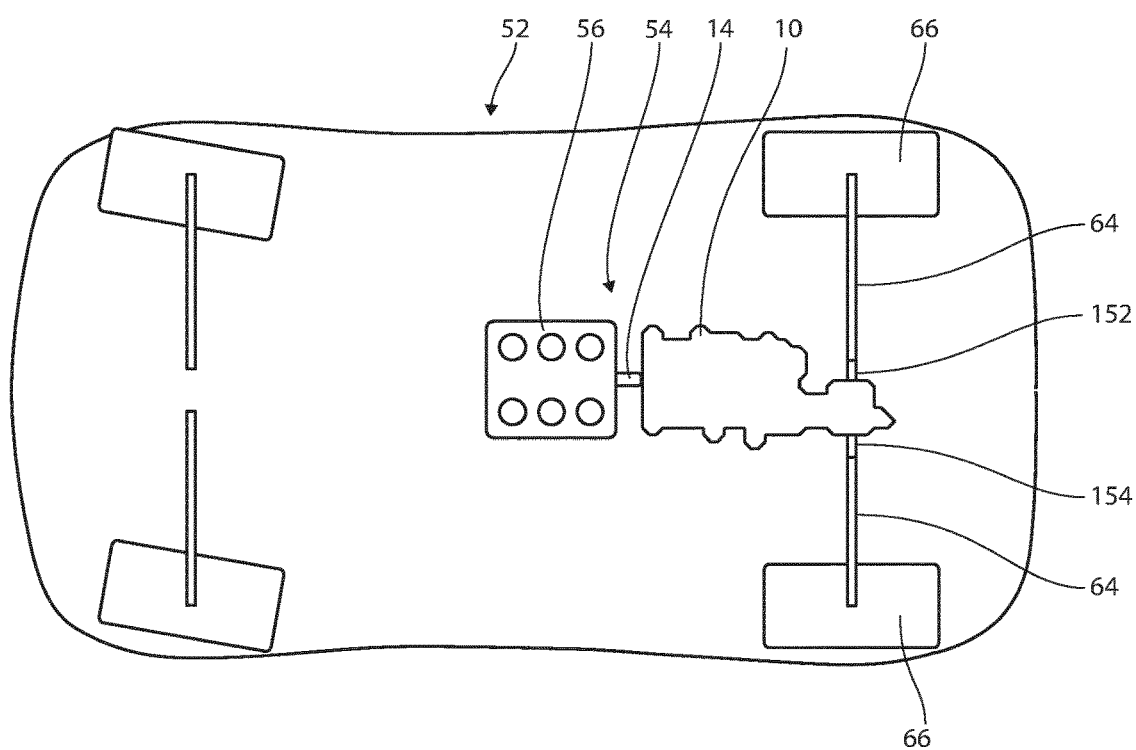
FIG. 6 illustrates an alternative embodiment of a road vehicle.

FIG. 6 schematically illustrates a road vehicle 52 in the form of a car. The road vehicle 52 has an internal combustion engine 56 and the gearbox 10 described in relation to FIGS. 5a-b. The first shaft 14 of the gearbox 10 is connected directly to the engine without any mechanical components therebetween, similar to the setup in FIG. 1. The first gear output shaft 152 and second gear output shaft 154 are connected to the drive axels 64 of the vehicle 52. The gearbox 10 converts torque that is received from the engine 56 and supplies the converted torque to the drive axles 64, which rotate the rear wheels 66 of the vehicle 52.

ITEM LIST 10 gear box
12 gearbox case
14 first shaft
16 second shaft 18 third shaft
20 first gear assembly
22 first gear wheel
24 second gear wheel
26 wet clutch of first gear assembly
30 second gear assembly
32 third gear wheel
34 fourth gear wheel
36 wet clutch of second gear assembly
38 counter shaft
40 reverse gear assembly
42 fifth gear wheel
44 sixth gear wheel
46 seventh gear wheel
47 eight gear wheel
48 wet clutch of reverse gear assembly
52 vehicle
54 powertrain
56 engine
60 crank shaft
64 drive axles
65 drive-axle wet clutch
66 rear wheels
102 first end of first shaft
104 second end of first shaft
106 starter-gear wheel
110 first first-shaft aperture
112 starter motor
114 starter-ring gear
116 pinion shaft
118 first pinion
120 pinion-shaft aperture
122 conical portion
124 wide end of conical portion
125 narrow end of conical portion
126 concave side
128 convex side
130 first end of third shaft
132 bevel gear
134 first enclosed space
136 second enclosed space
138 third-shaft aperture
140 bevel-gear pinion/second end of third shaft
142 bevel-gear wheel
144 gear-output shaft
146 first end of gear-output shaft
148 second end of gear-output shaft
150 differential
152 first gear-output shaft
154 second gear-output shaft
156 first pump
158 second pump
160 second first-shaft aperture
164 first rotary union
166 sump
168 second-shaft aperture
170 second end of the second shaft
172 second rotary union
174 third rotary union
176 carrier
178 third pump
180 reservoir
182 deaeration filter
184 particle filter
186 recirculation system
188 control unit
190 hydraulic conduits

The invention claimed is:

1. A gearbox for a road vehicle, the gearbox comprising:
a gearbox case;
a first shaft and a second shaft;
a plurality of first gear assemblies inside the gearbox case and operationally connecting the first shaft and the second shaft; and
a starter-gear wheel centered on and attached to the first shaft, wherein the first shaft has a first end and a second end, wherein the first end is configured to receive torque and is accessible from outside the gearbox case, wherein each of the first gear assemblies comprises a first gear wheel centered on the first shaft and a second gear wheel centered on the second shaft, and wherein the starter-gear wheel is located within the gearbox case.

2. The gearbox according to claim 1, further comprising:
an electric starter motor;
a pinion shaft operationally connected to the electric motor; and
a first pinion fixed to the pinion shaft and cooperating with the starter-gear wheel.

3. The gearbox according to claim 1, further comprising:
a third shaft; and
a plurality of second gear assemblies inside the gearbox case and operationally connecting the second shaft and the third shaft; wherein each of the second gear assemblies comprises a third gear wheel centered on the second shaft and a fourth gear wheel centered on the third shaft.

4. The gearbox according to claim 3, further comprising a bevel gear operationally connected to the third shaft, wherein the starter-gear wheel is at least in part positioned between the bevel gear and the first shaft.

5. The gearbox according to claim 1, further comprising:
a counter shaft;
a reverse-gear assembly inside the gearbox case and operationally connecting the first shaft and the second shaft via the counter shaft; and
a first pump operationally connected to the counter shaft and configured to generate a pressure in a first fluid, wherein the pressure in the first fluid is generated by a rotation of the counter shaft.

6. The gearbox according to claim 5, wherein the gearbox case forms a first enclosed space, wherein the plurality of first gear assemblies is located within the first enclosed space, and wherein the gearbox is configured to release the first fluid pressurized by the first pump within the first enclosed space.

7. The gearbox according to claim 5, further comprising a second pump operationally connected to the first shaft and configured to generate a pressure in a second fluid.

8. The gearbox according to claim 7, wherein each of the first gear assemblies comprises a hydraulically operated wet clutch configured to engage and disengage the first gear assembly, wherein the gearbox further comprises a control unit operationally connected to the wet clutch of each of the first gear assemblies and to the second pump, and wherein the control unit is configured to individually control a supply of the pressurized second fluid to each wet clutch.

9. The gearbox according to claim 8, wherein each wet clutch is centered on one of the first shaft and the second shaft and is individually coupled to the control unit by a hydraulic conduit, wherein the control unit supplies the wet clutch with the second fluid via the hydraulic conduit, wherein each of the first and second shafts upon which a wet clutch is centered is hollow, and wherein each hydraulic conduit extends from outside the gearbox case to the wet clutch via the hollow interiors of the first and second shafts.

10. The gearbox according to claim 3, wherein the gearbox case forms a first enclosed space, and the plurality of first gear assemblies and the plurality of second gear assemblies are located within the first enclosed space, wherein the gearbox case forms a third-shaft aperture through which the third shaft extends from the first enclosed space, and wherein the gearbox further comprises a seal configured to prevent a fluid from passing through the third-shaft aperture.

11. The gearbox according to claim 3, wherein the gearbox case forms an enclosed space, wherein the plurality of first gear assemblies is located within the enclosed space, wherein the gearbox further comprises a differential within the enclosed space and operationally connected to the third shaft, and wherein the gearbox is configured to release a fluid within the enclosed space at the plurality of first gear assemblies and at the differential.

12. The gearbox according to claim 11, further comprising:
a sump configured to collect the fluid released within the enclosed space; and
a recirculation system configured to recirculate the fluid collected by the sump back to the enclosed space for release within the enclosed space.

13. The gearbox according to claim 12, wherein the sump is a dry sump, the gearbox further comprising a reservoir in fluid communication with the dry sump and configured to store fluid collected by the dry sump.

14. The gearbox according to claim 1, wherein the gearbox is configured to be operatively connected to an internal combustion engine in the road vehicle.

15. The gearbox according to claim 1, wherein the first end of the first shaft is configured to be rotationally fixed to a crankshaft of an internal combustion engine in a road vehicle.

16. A gearbox for a road vehicle, the gearbox comprising:
a gearbox case;
a first shaft having a first end and a second end, the first end being accessible configured to receive torque from outside the gearbox case and configured to receive torque;
a second shaft;
a plurality of gear assemblies inside the gearbox case and operationally connecting the first shaft and the second shaft, each of the gear assemblies comprising a first gear wheel centered on the first shaft and a second gear wheel centered on the second shaft;
a counter shaft;
a reverse-gear assembly inside the gearbox case and operationally connecting the first shaft and the second shaft via the counter shaft; and
a pump operationally connected to the counter shaft and configured to generate a pressure in a fluid by a rotation of the counter shaft.

17. A gearbox for a road vehicle, the gearbox comprising:
a gearbox case;
a first shaft having a first end and a second end, the first end being accessible configured to receive torque from outside the gearbox case and configured to receive torque;
a second shaft;
a plurality of gear assemblies inside the gearbox case and operationally connecting the first shaft and the second shaft, each of the gear assemblies comprising a first gear wheel centered on the first shaft and a second gear wheel centered on the second shaft;
a starter-gear wheel centered on and attached to the first shaft; and
a pump operationally connected to the first shaft and configured to generate a pressure in a fluid.

* * * * *